(12) United States Patent
Bergstra et al.

(10) Patent No.: US 12,196,599 B2
(45) Date of Patent: Jan. 14, 2025

(54) MULTIPLE OBJECT DETECTION

(71) Applicant: Kindred Systems Inc., San Francisco, CA (US)

(72) Inventors: James Sterling Bergstra, Toronto (CA); David Gabriel Hallock, San Francisco, CA (US)

(73) Assignee: Ocado Innovation Limited, Hatfield (GB)

( * ) Notice: Subject to any disclaimer, the term of this patent is extended or adjusted under 35 U.S.C. 154(b) by 83 days.

(21) Appl. No.: 17/744,491

(22) Filed: May 13, 2022

(65) Prior Publication Data
US 2022/0276088 A1 Sep. 1, 2022

Related U.S. Application Data

(62) Division of application No. 15/931,265, filed on May 13, 2020, now Pat. No. 11,359,958.

(60) Provisional application No. 62/847,011, filed on May 13, 2019.

(51) Int. Cl.
G01G 23/42 (2006.01)
B23P 19/00 (2006.01)
G01G 23/20 (2006.01)
G01G 23/36 (2006.01)
G01G 23/40 (2006.01)

(52) U.S. Cl.
CPC ............ *G01G 23/42* (2013.01); *B23P 19/007* (2013.01); *G01G 23/20* (2013.01); *G01G 23/36* (2013.01); *G01G 23/40* (2013.01)

(58) Field of Classification Search
CPC ...... B23P 19/007; B25J 9/1694; G01G 23/20; G01G 23/36; G01G 23/40; G01G 19/42
See application file for complete search history.

(56) References Cited

U.S. PATENT DOCUMENTS

| 7,313,464 B1 * | 12/2007 | Perreault ............... B25J 9/1666 700/262 |
| 10,906,188 B1 * | 2/2021 | Sun ....................... B25J 9/1697 |
| 2016/0075031 A1 * | 3/2016 | Gotou .................... B25J 9/1633 901/34 |
| 2016/0167227 A1 * | 6/2016 | Wellman ................. B65G 1/10 901/3 |
| 2017/0369244 A1 * | 12/2017 | Battles ................. B65G 47/902 |
| 2018/0340819 A1 * | 11/2018 | Taira ....................... B25J 19/02 |
| 2020/0017297 A1 * | 1/2020 | Mohan .................. G06Q 50/28 |
| 2020/0269432 A1 | 8/2020 | Beinhofer et al. |
| 2023/0069565 A1 * | 3/2023 | Kalouche .............. B25J 9/1656 |

FOREIGN PATENT DOCUMENTS

| AT | 519452 B1 | 7/2018 |
| AU | 2018101189 A4 * | 9/2018 |
| EP | 2500150 A2 | 9/2012 |

(Continued)

*Primary Examiner* — Natalie Huls
(74) *Attorney, Agent, or Firm* — Seed Intellectual Property Law Group LLP

(57) ABSTRACT

A system for singulating objects includes a bin for receiving a collection of objects, a robotic manipulator for grasping objects from the bin, a scale for measuring a weight of the grasped objects, and a computer system for comparing measured weights to acceptable weight ranges to detect double picks. Methods include determining acceptable weight ranges by weighing a plurality of objects.

20 Claims, 16 Drawing Sheets

(56) References Cited

FOREIGN PATENT DOCUMENTS

| JP | 2014-24107 A | 2/2014 | |
|---|---|---|---|
| WO | WO-2018200503 A1 * | 11/2018 | ............... B07C 1/04 |
| WO | WO-2021081388 A1 * | 4/2021 | ............ B25J 13/082 |

* cited by examiner

MULTIPLE OBJECT DETECTION

BACKGROUND

Technical Field

The present disclosure relates to autonomous robotic manipulation in industrial systems and, more specifically, to detection that a robotic manipulator has selected multiple objects rather than a single, individual object, which may represent a failure of an effort to singulate objects, and which may be referred to as "double pick" detection.

Description of the Related Art

Automated robotics, conveyors, and other motive devices are used in many industrial or logistic applications to sort, relocate, convey, or otherwise manipulate objects in order to achieve a desired goal. All of the objects in certain industrial or logistical operations may be of the same type such that the same destination or operation is applicable to each object involved. In postal services, for example, sorting machines process letters and parcels via recognition of optical characters thereon and imprint each processed item of mail with a corresponding barcode indicating a destination for the respective processed item of mail. The operation to be performed for each object is therefore predetermined and the process may be easily automated.

In some situations, automated processing of a collection of objects remains a complex and difficult challenge. Consider a scenario in which a collection of objects are assembled that include different object types and each object type is to be processed differently than other object types. In a manufacturing operation, a collection of objects (e.g., shipment) may be received that includes a uniform collection of components of the same type. In other scenarios, a collection of objects may be received that includes different object types, each object type to be processed differently than the other object types. In some solutions, artificial intelligence technologies (e.g., convolutional neural networks) may be implemented to optically recognize an object by, e.g., a size of the object, a shape of the object, and/or content of a label on the object. However, such artificial intelligence solutions require a significant amount of training to sufficiently train the artificial intelligence model to recognize each type of object involved. Furthermore, artificial intelligence solutions may be subject to some level of error, which can adversely affect the quality or consistency of the process implemented.

It is important that automated robotics, conveyors, and other motive devices used to sort, relocate, convey, or otherwise manipulate objects are able to singulate the objects, that is, to separate individual objects from the collection and from one another. To do so, it is furthermore important that such devices are able to determine, detect, or identify whether the objects have been successfully singulated or separated from one another.

BRIEF SUMMARY

A singulation system may be summarized as comprising: a container configured to receive singulated objects from a collection of objects to be singulated; a robotic manipulator configured to pick up an individual object from the collection of objects; a sensor configured to measure a weight of the individual object; and a computer system configured to compare the measured weight of the individual object to an acceptable range of weights for the individual object to confirm that the individual object was successfully singulated.

The container may be a tilt tray. The robotic manipulator may be configured to deposit the individual object into the container and the sensor may be a scale configured to measure a weight of the individual object while the individual object is in the container. The sensor may be a component of the robotic manipulator. The sensor may be a scale or a strain gage. The sensor may be a weighing conveyor belt and the robotic manipulator may be configured to deposit the individual object onto the weighing conveyor belt. The singulation system may further comprise a separating conveyor belt configured to receive the individual object from the weighing conveyor belt. The separating conveyor belt may include a diverter configured to modify a path across the separating conveyor belt based on the confirmation that the individual object was successfully singulated. The diverter may be a wiper configured to move to a first position, wherein in the first position the wiper blocks the path across the separating conveyor belt, and to move to a second position, wherein in the second position the wiper does not block the path across the separating conveyor belt.

A method of singulating objects from a collection of objects may be summarized as comprising: receiving the collection of objects; using a robotic manipulator to pick up at least one object from the collection of objects; measuring a weight of the at least one object picked up by the robotic manipulator; determining a characteristic of the at least one object picked up by the robotic manipulator; comparing the measured weight to an acceptable range of weights for an individual object having the determined characteristic; determining, based on the comparison, whether or not the at least one object was successfully singulated; and depositing the at least one object into a container.

The method may further comprise selecting the container from a plurality of containers based on the determination that the at least one object was or was not successfully singulated. Determining a characteristic of the at least one object may include reading an RFID tag, scanning a barcode, and/or visually determining the characteristic. Depositing the at least one object into a container may include tilting a tilt tray. The method may further comprise, prior to receiving the collection of objects, determining the acceptable range of weights. Determining the acceptable range of weights may include weighing a plurality of objects having the determined characteristic. Determining the acceptable range of weights may include determining an average of weights of the plurality of objects and a statistical variance in the weights of the plurality of objects. Determining the acceptable range of weights may be based on weights of objects that do not have the determined characteristic.

DETAILED DESCRIPTION

Figure 1:
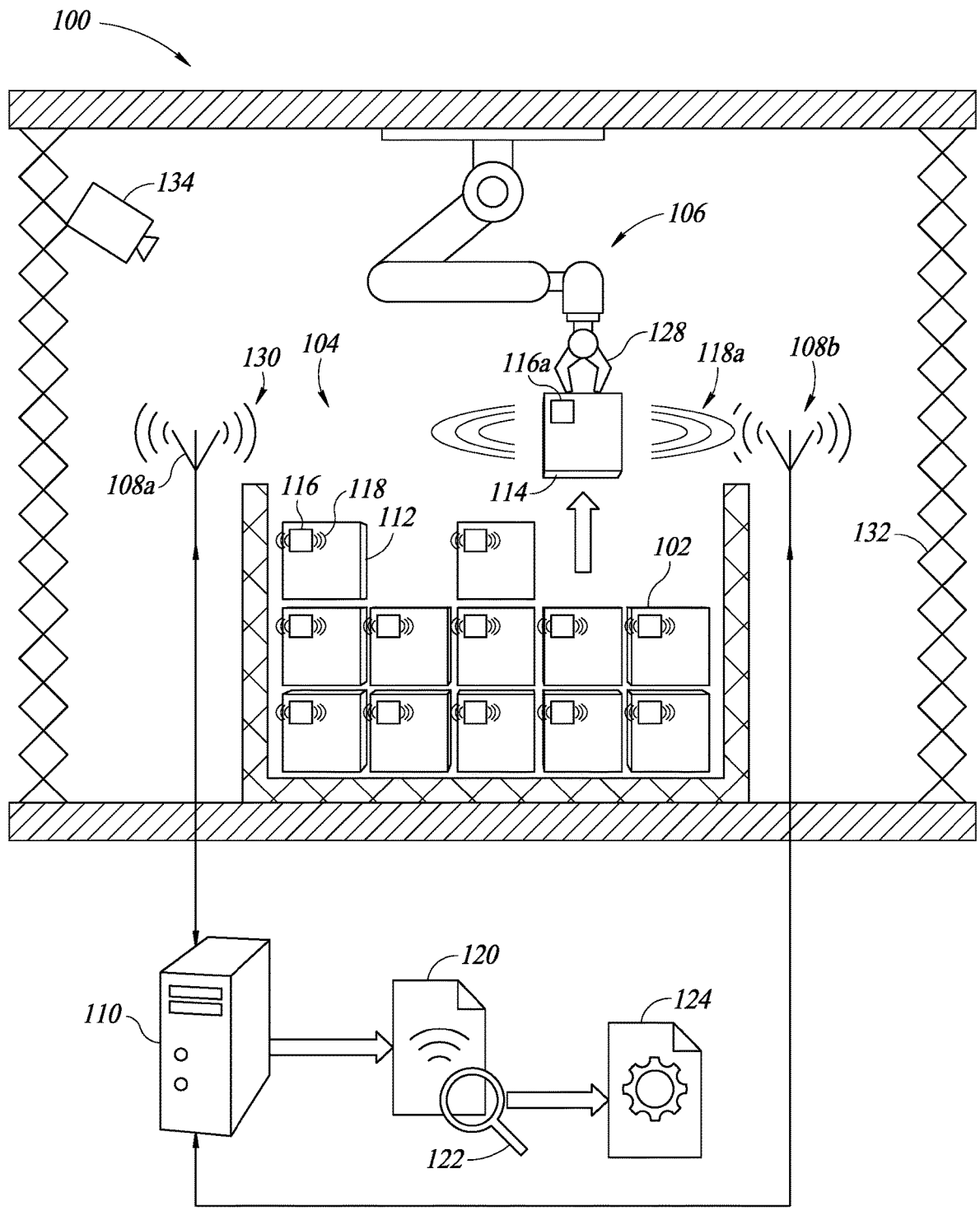
FIG. 1 is an environment in which a manipulated object of a plurality of objects is recognized.

FIG. 1 shows an environment 100 in which a manipulated object of a plurality of objects 102 is recognized according to one or more embodiments. The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

Referring to FIG. 1, the environment 100 includes a plurality of objects 102 collected in a designated area 104, a robotic manipulator 106 located in the designated area 104, a set of antennas 108 positioned proximate to the plurality of objects 102 in the designated area 104, and one or more computer systems 110 configured to perform various operations described herein. In an embodiment, the plurality of objects 102 can be comprised of objects having a plurality of different object types, each type having a different property than the other object types. For example, the plurality of objects 102 includes a first set of objects of a first type and a second set of objects of a second type. The objects of the plurality of objects 102 may differ in type based on physical property of the object, such as a size, a shape, a weight, a function, or a color of the object, a density of the object, a rigidity of the object, and the like, by way of non-limiting example. In some embodiments, the plurality of objects 102 may have a different type based on a content of the object. For instance, the plurality of objects 102 may be containers that include a first set of containers containing a first type of object and a second set of containers containing a second type of object.

Each object 112 of the plurality of objects 102 has a corresponding operation to be performed involving the object, the particular operation to be performed based on the type of the object 112. The robotic manipulator 106 is configured to successively extract an object 114 from the collected plurality of objects 102 and manipulate the object 114 extracted based on the operation to be performed for the object. However, the robotic manipulator 106 does not recognize the type of the object 114 when the object 114 is located among the collected plurality of objects 102. Each object of the plurality of objects 102 is equipped with a radiofrequency (RF) transponder 116 configured to emit an RF signal encoding an identifier corresponding to the type of object on or in which the transponder 116 is provided.

Each transponder 116 is embodied as a tag, sticker, label, etc., that includes an antenna for receiving and transmitting wireless signals, and an integrated circuit configured to encode an identifier in an RF reply signal 118 transmitted by the antenna. The integrated circuit may be hardwired (e.g., as a field programmable gate array) with information specifying the identifier to be encoded in the RF signal transmitted, or may include or be coupled to non-volatile memory (e.g., read-only memory, solid-state memory) storing information specifying the identifier to be encoded in the RF signal transmitted. The transponders 116, in some embodiments, are RF identification tags that are affixed to an exterior surface of the object, embedded within a surface of the object, or provided in an interior compartment of the object.

In at least some embodiments, the RF transponder 116 is a passive transponder not equipped with a battery and instead including circuitry that collects power from an RF interrogation signal for powering the integrated circuit to emit an RF reply signal encoding the identifier. In some embodiments, the transponder 116 may be an active transponder equipped with a battery that powers the integrated circuitry to emit an RF signal encoding the identifier. In such implementations, the active transponder may be configured to periodically emit the RF signal, or detect an RF interrogation signal and emit the RF signal in response. A passive transponder may be preferable to an active transponder in the context of the present disclosure to facilitate synchronization of the RF signals transmitted by the transponders 116 of the plurality of objects 102. For example, active transponders may periodically transmit RF signals such that a first active transponder may transmit RF signals with different timing (e.g., a different frequency, out of phase) than a second active transponder. In another embodiment, the transponder 116 may be a semi-passive transponder equipped with a battery, but which does not transmit an active signal.

In the context of the present disclosure, transmission of RF signals at different timings may make correlation of signal characteristics difficult. By contrast, passive transponders transmit RF reply signals in response to an RF interrogation signal, which can promote correlation in time of signal characteristics thereof.

The computer system 110 is communicatively coupled with the set of antennas 108 and configured to obtain signal information 120 regarding the RF signals 118, including the RF reply signal 118a, received by the set of antennas 108. The computer system 110 performs analysis 122 involving the signal information 120 and identifies the type of the object 114 extracted or manipulated by the robotic manipulator 106 based on a result of the analysis 122. The RF signals 118 obtained and the signal information 120 associated thereof are obtained in connection with extraction or manipulation of the object 114 by the robotic manipulator 106. The analysis 122 involves comparing a signal characteristic of the RF signals 118 emitted by the transponders 116 of the plurality of objects 102 and the object 114 to identify a signal 118a emitted by a transponder 116a of the object 114.

The computer system 110 determines an identifier encoded in the RF reply signal 118a from the transponder 116a of the object 114 identified in performs additional operations as a result of determining the identifier. In some implementations, the computer system 110 may determine information 124 regarding one or more operations to be performed by the robotic manipulator 106 or other machinery or devices in or around the environment 100. For example, the computer system 110 may send the information 124 causing the robotic manipulator 106 or other devices to perform operations corresponding to the identifier of the transponder 116a, such as information specifying a location at which the robotic manipulator 106 should place the object 114. The computer system 110 may, as another example, send information corresponding to or specifying the identifier, such as information indicating the type of the object 114. As a further example, the computer system 110 may determine a device or machinery to which to send the information 124 based on the identifier of the transponder 116a.

The plurality of objects 102 may be containers, such as boxes, crates, barrels, bags, or other receptacle having a structure in which content (e.g., other objects, materials, items, goods) are contained. In such situations, the content contained in the objects 102 may not be apparent without further inspection of the content or optical scanning of a label on an exterior of the objects 102. According to the present disclosure, an operation to be performed corresponding to the content of the object 114, such as a destination thereof, may be may be quickly and accurately determined as the object 114 is extracted based on the identifier of the RF signals 118 emitted. The environment 100 may be a located in a manufacturing facility and the plurality of objects 102 may be parts or components used in a manufacturing process performed in the manufacturing facility. According to the present disclosure, each object 114 extracted from the collected plurality of objects 102 can be identified and assembled, positioned, etc., based on the RF signal identifier to improve automation of the manufacturing process. The plurality of objects 102 may be collected in the designated area 104 which may be a designated volume or area allocated for collection of objects. For instance, the designated area 104 may be a container or other partially enclosed volume having sidewalls extending upwardly and defining a cavity in which the plurality of objects 102 are to be located for processing. As another example, the designated area 104 may be a platform or demarcated area on a floor allocated for processing the plurality of objects 102.

The robotic manipulator 106 may include a movable structure equipped with an end-effector 128 at a distal end of the structure for securing and extracting the object 114 from the plurality of objects 102. The end-effector 128 is a mechanism for selectively securing the object 114 to the distal end to facilitate extraction, transport, and manipulation of the object 114. Non-limiting examples of the end-effector 128 include a selectively openable and closable gripper, a hook, a suction mechanism for selectively securing the object 114 using a vacuum seal, an electromagnetic device, or other such mechanism. The end-effector 128 may be particularly configured to secure, grasp, hold, etc., the particular design of the objects 102. The movable structure may be, for example, an arm comprising a number of segments and joints that facilitate relative movement between adjacent segments. As another example, the movable structure of the robotic manipulator 106 may be a frame having a cable that is selectively extendable to position the end-effector 128 to secure and grasp the object 114, and that is selectively retractable to extractor separate the object 114 from the remaining plurality of objects 102.

The robotic manipulator 106 may be movable relative to a position of the designated area 104 to relocate the object 114 based on the RF signal identifier thereof. The robotic manipulator 106 shown in the environment 100 is located on a ceiling of the designated area 104; however, the robotic manipulator 106 is not so limited. The robotic manipulator 106 may be configured to move along floors or walls of the designated area, if desired. The robotic manipulator 106 may be part of a mobile robot equipped with legs, wheels, treads, or other motive devices for independent movement of the mobile robot. Additional details regarding the robotic manipulator 106 are discussed with respect to FIG. 2 and elsewhere herein.

The set of antennas 108 are each located in a fixed position proximate to the designated area 104. The computer system 110 causes the set of antennas 108 to emit RF interrogation signals 130 having a sufficient power to cause the transponders 116 of the plurality of objects 102 and the transponder 116a of the object 114 to generate and emit the RF response signals 118 and 118a. The set of antennas 108 are positioned around the designated area 104 such that the RF interrogation signals 130 reach every transponder 116 of the plurality of objects in the designated area 104.

In some embodiments, the set of antennas 108 may be a plurality of antennas symmetrically arranged around the designated area 104. In the environment 100 shown, for example, a first antenna 108a is located on a first side of the designated area 104 and a second antenna 108b is located on a second side of the designated area 104 opposite to the first side. The designated area 104 may have a symmetric shape, such as a circular or rectangular shape, and a third antenna and a fourth antenna (not shown) may be positioned at opposite sides of the designated area 104 halfway between the first antenna 108a and the second antenna 108b. In some embodiments, the set of antennas 108 may be positioned above the designated area 104, such as projecting down from a ceiling over the designated area 104, or being affixed to supports above and around the designated area 104. It is noted that the set of antennas 108 are not located on or fixed to the robotic manipulator 106. Instead, the robotic manipulator 106 moves the object 114 relative to the set of antennas 108 within the environment 100. Changes in a signal characteristic of the RF response signals 130 relative to the fixed set of antennas 108 are detected to identify the transponder 116a by the identifier encoded.

The antennas 108 may include one or more types of antenna. For instance, the one or more antennas 108 may include a parabolic antenna, a dipole antenna, a circular antenna, a circular polarization antenna, a cloverleaf antenna, or other similar antenna that can receive or transmit election regular waves of one or more polarizations in that one or more desired frequencies. Each of the one or more antennas 108 may be individually operable by the computer system, via a reader 302, to selectively send and receive RF signals.

In yet another embodiment, each object of the plurality of objects 102 is equipped with a real-time location system (RTLS) transponder configured to emit ultra-wideband signals, WiFi signals, or infrared signals which are received by the antennas 108.

The environment 100 may include electromagnetic shielding 132 at least partially surrounding the designated area 104 to shield the designated area 104 from external electromagnetic interference and prevent RF signals emitted from the set of antennas 108 or the transponders 116 from interfering with nearby equipment. The electromagnetic shielding 132 may be, for example, a Faraday cage around, above, and/or below the designated area 104. In some embodiments, the environment 100 may include a plurality of designated areas 104 that are each electromagnetically shielded from other designated areas 104 to prevent interference of RF signals therebetween.

The environment 100 may include one or more sensors, such as a camera 134, to detect a presence of the plurality of objects 102 or other conditions in the designated area 104. The camera 134 shown in the environment 100 is positioned to capture images of the designated area 104. The computer system 110 may receive images or video obtained by the camera 134 and cause emission of the RF interrogation signals 130 and obtain the signal information 120 based on the RF reply signals 118 from the transponders 116. The computer system 110 may use imaging captured by the camera 134 to determine time periods when the robotic manipulator 106 is moving the object 114 from the designated area 104, and correlate the signal information 120 obtained relative to the movement of the object 114. The computer 110 may analyze the imaging captured by the camera 134 in real-time, or in near real-time.

Figure 2:
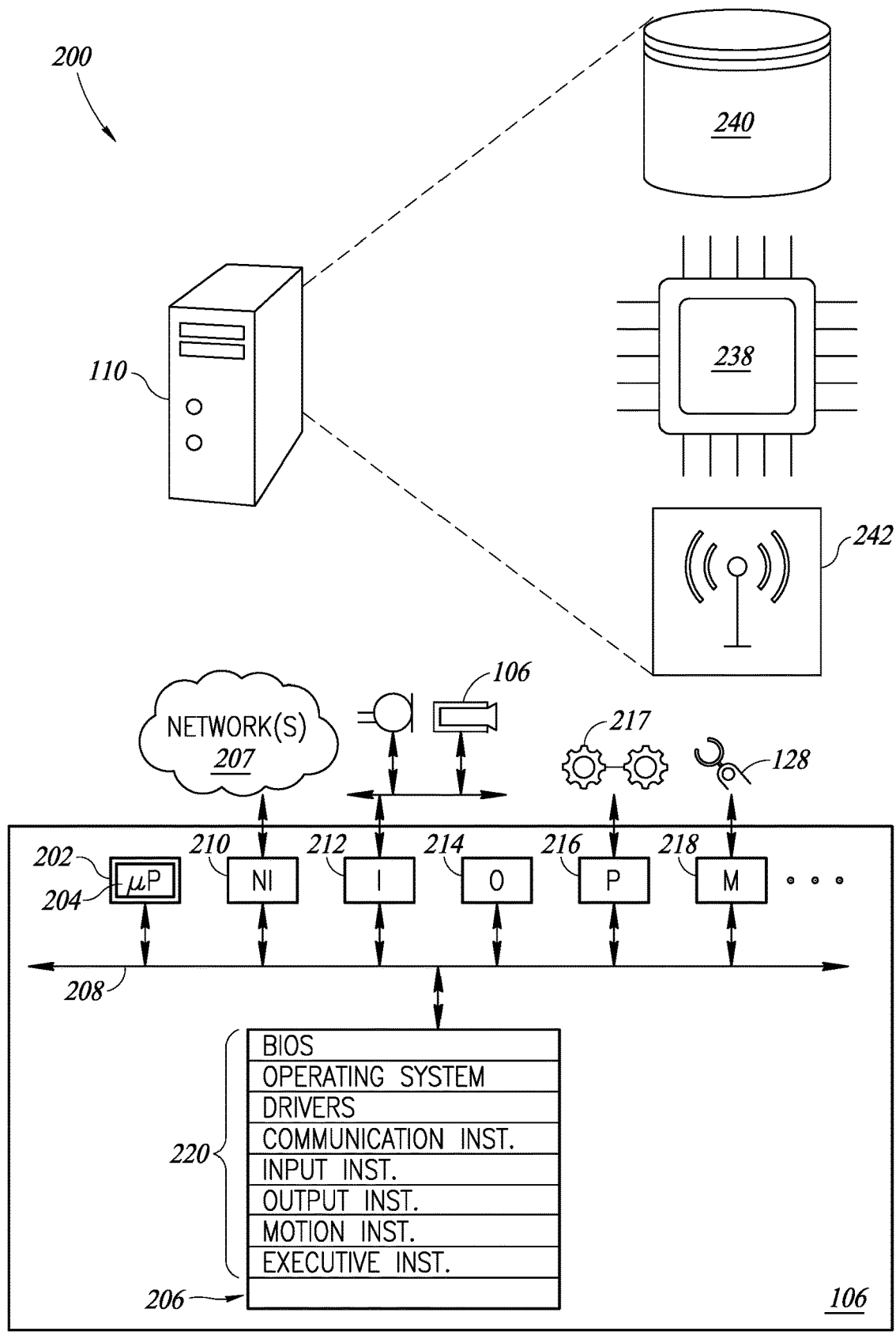
FIG. 2 is a schematic diagram of a computer system communicatively coupled with components of the environment of FIG. 1.

FIG. 2 shows a schematic diagram 200 of the computer system 110 and the robotic manipulator 106 operating in the environment 100 according to one or more embodiments. As discussed herein, the robotic manipulator 106 and robots, in general, may take any of a wide variety of forms. The robotic manipulator 106 may include at least one body, such as a plurality of connected segments that are movable relative to each other and connected by joints. The robotic manipulator 106 may include a control subsystem 202 that includes at least one processor 204, at least one non-transitory tangible computer- and processor-readable data storage 206, and at least one bus 208 to which the at least one processor 204 and the at least one non-transitory tangible computer- or processor-readable data storage 206 are communicatively coupled.

The at least one processor 204 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. At least one processor 204 may be referred to herein by the singular, but may be two or more processors.

Robotic manipulator 106 may include a communications subsystem 210 communicatively coupled to (e.g., in communication with) the bus(es) 208 and provides bi-directional communication with other systems (e.g., systems external to the robotic manipulator 106) via a network or non-network communication channel, such as one or more network(s) 207 described herein. The communications subsystem 210 may include one or more buffers. The communications subsystem 210 receives and sends data for the robotic manipulator 106, such as sensory information and actuation information. The one or more networks 207 may include wired and/or wireless networks, a local area network (LAN), a mesh network, or other network suitable to convey medications and information described herein. In some embodiments, the computer system 110 and the robotic manipulator 106 may not communicate over the one or more networks 207.

The communications subsystem 210 may be any circuitry effecting bidirectional communication of processor-readable data, and processor-executable instructions, for instance radios (e.g., radio or microwave frequency transmitters, receivers, transceivers), communications ports and/or associated controllers. Suitable communication protocols include FTP, HTTP, Web Services, SOAP with XML, WI-FI compliant, BLUETOOTH compliant, cellular (e.g., GSM, CDMA), and the like.

Robotic manipulator 106 may include an input subsystem 212. In any of the implementations, the input subsystem 212 can include one or more sensors that measure conditions or states of robotic manipulator 106, and/or conditions in the environment 100 in which the robotic manipulator 106 operates. Such sensors include cameras or other imaging devices (e.g., responsive in visible and/or nonvisible ranges of the electromagnetic spectrum including for instance infrared and ultraviolet), radars, sonars, touch sensors, pressure sensors, load cells, microphones, meteorological sensors, chemical sensors, or the like. Such sensors include internal sensors, pressure sensors, load cells, strain gauges, vibration sensors, microphones, ammeter, voltmeter, or the like. In some implementations, the input subsystem 212 includes receivers to receive position and/or orientation information. For example, a global position system (GPS) receiver to receive GPS data, two more time signals for the control subsystem 202 to create a position measurement based on data in the signals, such as, time of flight, signal strength, or other data to effect (e.g., make) a position measurement. Also, for example, one or more accelerometers, gyroscopes, and/or altimeters can provide inertial or directional data in one, two, or three axes. In some implementations, the input subsystem 212 includes receivers to receive information that represents posture. For example, one or more accelerometers or one or more inertial measurement units can provide inertial or directional data in one, two, or three axes to the control subsystem 202 to create a position and orientation measurements. The control subsystem 202 may receive joint angle data from the input subsystem 212 or the manipulation subsystem described herein.

Robotic manipulator 106 may include an output subsystem 214 comprising output devices, such as, speakers, lights, and displays. The input subsystem 212 and output subsystem 214, are communicatively coupled to the processor(s) 204 via the bus(es) 208.

Robotic manipulator 106 may include a propulsion or motion subsystem 216 comprising motive hardware 217, such as motors, actuators, drivetrain, wheels, tracks, treads, and the like to propel or move the robotic manipulator 106 within a physical space and interact with it. The propulsion or motion subsystem 216 may comprise of one or more motors, solenoids or other actuators, and associated hardware (e.g., drivetrain, wheel(s), treads), to propel robotic manipulator 106 in a physical space. For example, the propulsion or motion subsystem 216 may include a drive train and wheels, or may include legs independently operable via electric motors. Propulsion or motion subsystem 216 may move the body of the robotic manipulator 106 within the environment 100 as a result of motive force applied by the set of motors 306.

Robotic manipulator 106 may include a manipulation subsystem 218, for example comprising one or more arms, end-effectors, associated motors, solenoids, other actuators, gears, linkages, drive-belts, and the like coupled and operable to cause the arm(s) and/or end-effector(s) to move within a range of motions. For example, the manipulation subsystem 218 causes actuation of the robotic arm 304 or other device for interacting with objects or features in the environment 100. The manipulation subsystem 218 is communicatively coupled to the processor(s) 204 via the bus(es) 208, which communications can be bi-directional or uni-directional.

Components in robotic manipulator 106 may be varied, combined, split, omitted, or the like. For example, robotic manipulator 106 could include a pair of cameras (e.g., stereo pair) or a plurality of microphones. Robotic manipulator 106 may include one, two, or three robotic arms or manipulators associated with the manipulation subsystem 218. In some implementations, the bus(es) 208 include a plurality of different types of buses (e.g., data buses, instruction buses, power buses) included in the at least one body 314. For example, robotic manipulator 106 may include a modular computing architecture where computational resources devices are distributed over the components of robotic manipulator 106. In some implementations, a robot (e.g., robotic manipulator 106), could have a processor in an arm and data storage in a body or frame thereof. In some implementations, computational resources are located in the interstitial spaces between structural or mechanical components of the robotic manipulator 106.

The at least one data storage 206 includes at least one non-transitory or tangible storage device. The at least one data storage 206 can include two or more distinct non-transitory storage devices. The data storage 206 can, for example, include one or more a volatile storage devices, for instance random access memory (RAM), and/or one or more non-volatile storage devices, for instance read only memory (ROM), Flash memory, magnetic hard disk (HDD), optical disk, solid state disk (SSD), and the like. A person of skill in the art will appreciate storage may be implemented in a variety of non-transitory structures, for instance a read only memory (ROM), random access memory (RAM), a hard disk drive (HDD), a network drive, flash memory, digital versatile disk (DVD), any other forms of computer- and processor-readable memory or storage medium, and/or a combination thereof. Storage can be read only or read-write as needed. Further, volatile storage and non-volatile storage may be conflated, for example, caching, using solid-state devices as hard drives, in-memory data processing, and the like.

The at least one data storage 206 includes or stores processor-executable instructions and/or processor-readable data 220 associated with the operation of robotic manipulator 106 or other devices. Here, processor-executable instructions and/or processor-readable data may be abbreviated to processor-executable instructions and/or data.

The execution of the processor-executable instructions and/or data 220 cause the at least one processor 204 to carry out various methods and actions, for example via the motion subsystem 216 or the manipulation subsystem 218. The processor(s) 204 and/or control subsystem 202 can cause robotic manipulator 106 to carry out various methods and actions including receiving, transforming, and presenting information; moving in the environment 100; manipulating items; and acquiring data from sensors. Processor-executable instructions and/or data 220 can, for example, include a basic input/output system (BIOS) 222, an operating system 224, drivers 226, communication instructions and data 228, input instructions and data 230, output instructions and data 232, motion instructions and data 234, and executive instructions and data 236.

Exemplary operating systems 224 include ANDROID™, LINUX®, and WINDOWS®. The drivers 226 include processor-executable instructions and/or data that allow control subsystem 202 to control circuitry of robotic manipulator 106. The processor-executable communication instructions and/or data 228 include processor-executable instructions and data to implement communications between robotic manipulator 106 and an operator interface, terminal, a computer, or the like. The processor-executable input instructions and/or data 230 guide robotic manipulator 106 to process input from sensors in input subsystem 212. The processor-executable input instructions and/or data 230 implement, in part, the methods described herein.

The processor-executable output instructions and/or data 232 guide robotic manipulator 106 to provide information that represents, or produce control signal that transforms, information for display. The processor-executable motion instructions and/or data 234, as a result of execution, cause the robotic manipulator 106 to move in a physical space and/or manipulate one or more items. The processor-executable motion instructions and/or data 234, as a result of execution, may guide the robotic manipulator 106 in moving within its environment via components in propulsion or motion subsystem 216 and/or manipulation subsystem 218. The processor-executable executive instructions and/or data 236, as a result of execution, guide the robotic manipulator 106 the instant application or task for devices and sensors in the environment 100. The processor-executable executive instructions and/or data 236, as a result of execution, guide the robotic manipulator 106 in reasoning, problem solving, planning tasks, performing tasks, and the like.

The instructions 220, as a result of execution by the processor(s) 204, may cause the robotic manipulator 106 to process the plurality of objects 102 by successively extracting each object (i.e., as the object 114) from the designated area 104. The instructions 220 may further cause the processor(s) 204 to process input information received via the input subsystem 212, such as video data captured by a camera or measurements by one or more sensors, and recognize the presence of the plurality of objects 102 located in the designated area 104 based on the input information received. Instructions 220 may also cause the robotic manipulator 106 to, while in possession of the object 114 extracted, perform a set of movements and deposit the object 114 in a certain location. In some embodiments, the robotic manipulator 106 may, while in possession of the object 114 extracted, receive a communication from the computer system 110 and deposit the object 114 and a location indicated in the communication received. In some embodiments, the robotic manipulator 106 operates independently of the computer system 110 when processing the plurality of objects 102 and may deposit each object 114 extracted in a predetermined area or location (e.g., conveyor belt, receptacle).

The computer system 110 includes one or more processors 238, memory 240, and a communication interface 242. The memory 240 is computer-readable non-transitory data storage that stores a set of computer program instructions that the one or more processors 238 may execute to implement one or more embodiments of the present disclosure. The memory 240 generally includes RAM, ROM and/or other persistent or non-transitory computer-readable storage media, such as magnetic hard drives, solid state drives, optical drives, and the like. The memory 240 may store an operating system comprising computer program instructions useable by the one or more processors 238 in the general administration and operation of the computer system 110.

The communication interface 242 includes one or more communication devices for transmitting communications and receiving communications via the network 207. The one or more communication devices of the communication interface may include wired communication devices and/or wireless communication devices. Non-limiting examples of wireless communication devices include RF communication adapters (e.g., Zigbee adapters, Bluetooth adapters, ultra-wideband adapters, Wi-Fi adapters) using corresponding communication protocols, satellite communication transceivers, free-space optical communication devices, cellular network transceivers, and the like. Non-limiting examples of wired communication devices include serial communication interfaces (e.g., RS-232, Universal Serial Bus, IEEE 139), parallel communication interfaces, Ethernet interfaces, coaxial interfaces, optical fiber interfaces, and power-line communication interfaces. The computer system 110 may transmit information via the communication interface 242 to the robotic manipulator 106 or other robots, devices, machinery, etc., based on the identifier of the transponder 116a, such as information indicating an operation to be performed involving the object 114.

The computer system 110 and the robotic manipulator 106 may communicate information over the one or more networks 207 regarding the operations described with respect to the environment 100. Referring to FIG. 1, the computer system 110 may cause the set of antennas 108 to emit the RF interrogation signals 130 in response to detecting that robotic manipulator 106 is about to begin processing the plurality of objects 102. As a result of identifying the identifier emitted by the transponder 116a of the object 114, the computer system 110 may send a communication over the one or more networks 207 to the robotic manipulator 106 indicating, for example, a location to place the object 114. In some implementations, the computer system 110 may send a communication over the one or more networks 207 to another device in or around the environment 100 indicating an operation involving the object 114.

In some embodiments, the computer system 110 and the robotic manipulator 106 may not communicate over the one or more networks 207. For example, the robotic manipulator 106 may operate autonomously and independent of the computer system 110 to successively extract each of the plurality of objects 102 from the designated area 104. The computer system 110 may detect or observe operations of the manipulator 106, e.g., via the camera 134 and/or other sensors, and cause devices, machinery, or robots other than the robotic manipulator 106, to perform operations involving each object 114 extracted. As an example, the computer system 110 may detect the identifier of each object 114 upon extraction and control a series of conveyors to deliver the object 114 to a desired location corresponding to the identifier.

Figure 3:
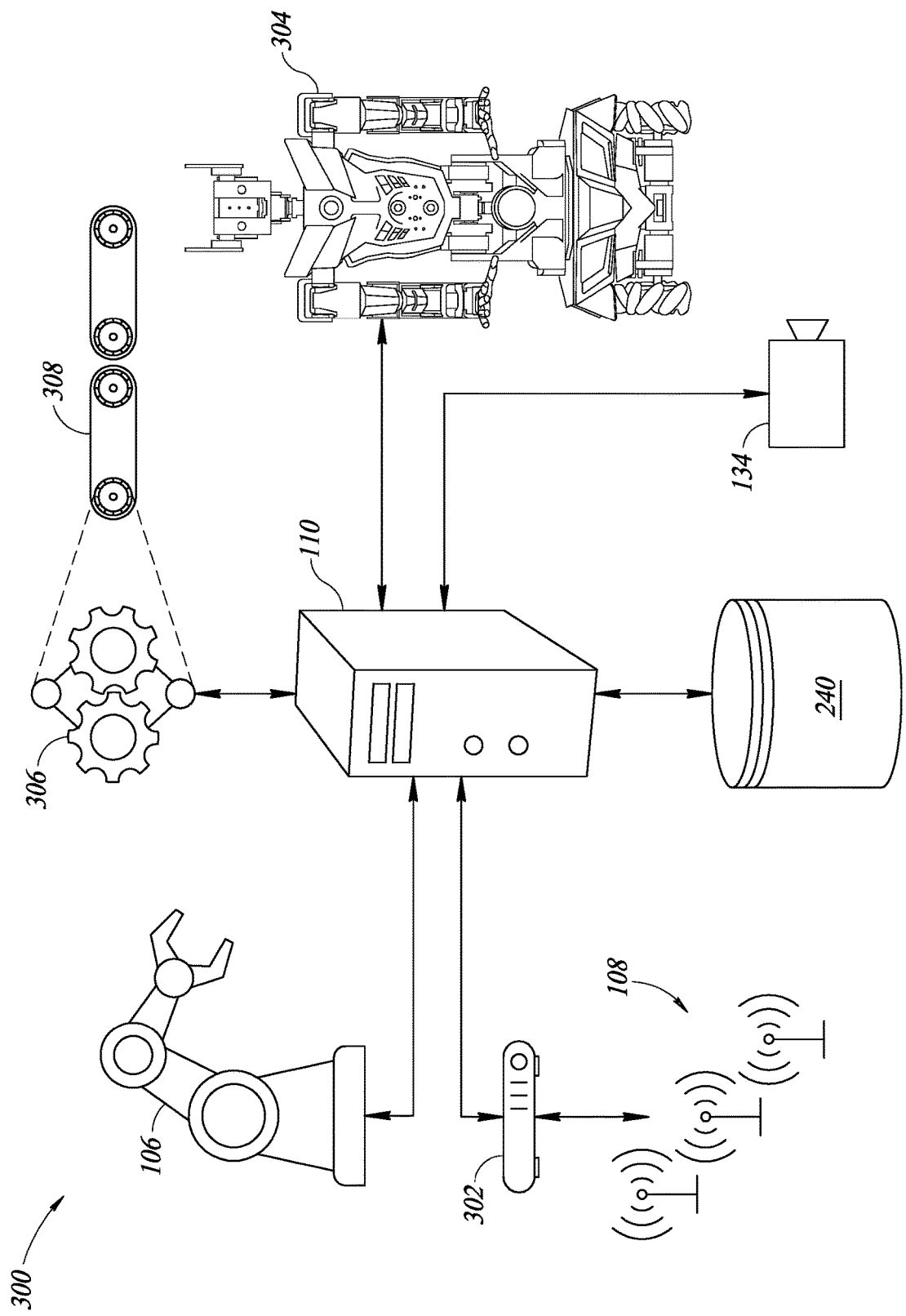
FIG. 3 is a schematic diagram of a robotic system communicatively coupled with the computer system of FIG. 2.

FIG. 3 shows a schematic diagram 300 of a system for performing operations in connection with extraction of the plurality of objects 102 according to one or more embodiments. The schematic diagram 300 includes the computer system 110 which is electrically communicatively coupled to the set of antennas 108. The computer system 110 is configured to cause the set of antennas 108 to emit the RF interrogation signal 130 in connection with extraction, by the robotic manipulator 106, of the plurality of objects 102 from the designated area 104.

As shown in the schematic diagram 300, the computer system 110 may be electrically communicatively coupled to the set of antennas 108 via a reader 302. The reader 302 receives a signal from the computer system 110, via a wired or wireless connection, instructing the reader 302 to generate an electrical signal that causes the set of antennas 108 to emit the RF interrogation signal 130. The reader 302 may be programmed, hardwired, or otherwise configured to generate an electrical signal having certain characteristics to cause the transponders 116 to emit an RF reply signal. Such characteristics include a signal power level or amplitude sufficient to energize the passive RF transponders 116 in the environment 100. The signal characteristics also include a frequency that is particular to the transponders 116. In some embodiments, the reader 302 is configured or programmed to generate frequencies in a high frequency range (e.g., between 3 to 30 MHz) and receive RF response signals from the transponders 116 having one or more corresponding frequencies. The transponders 116, for example, may emit an RF reply signal 118 having a frequency of 13.56 MHz. However, other frequency ranges may be implemented for the reader 302 and the corresponding transponders 116 based on characteristics of the environment 100, such as its size, geometry, composition of walls, floor, ceiling enclosing the environment 100, or other considerations. In some embodiments, the transponders 116 and the readers 302 thereof may utilize nearfield communication (NFC) instead of or in connection with RFID technology. Other frequency ranges may be used in the context of the present disclosure, such as low-frequency RFID having a frequency range between 30 KHz to 300 KHz, or ultrahigh frequency RFID having a frequency range between 300 MHz to 3 GHz.

The reader 302 may alternately emit the RF interrogation signal 130 and receive RF response signals from the transponders 116. For example, the reader 302 may generate an electric signal for a first time period to cause emission of the RFID interrogation signal 130 by the set of antennas 108. After the first time period, the reader 302 may wait for a second time period before generating another electric signal. During the second time period, the reader 302 may receive a plurality of reply signals (i.e., the RF reply signal 118), via the set of antennas 108, having a corresponding frequency in response.

The RF reply signal encodes an identifier of the transponder 116 that emitted the RF reply signal. The reader 302 generates signal information regarding the RF reply signals received and provides the signal information to the computer system 110. The signal information includes, for each RF reply signal received, information specifying the identifier encoded in the RF reply signal and information regarding a signal characteristic of the RF reply signal received. The signal characteristic may be a signal strength or measure of power level of the RF reply signal, such as a Received Signal Strength Identifier (RSSI), Total Isotropic Sensitivity (TIS), Time of Flight (ToF), and the like. The signal information generated in provided by the reader 302 may include other information regarding the RF reply signals received, such as temporal information indicating a time at which the RF reply signal or signals were received or temporal information indicating a time at which the preceding RF interrogation signal 130 was transmitted.

The reader 302 is shown as being separate from the computer system 110 in FIG. 3; however, the present disclosure is not so limited. The reader 302 may be integrated with or part of the computer system 110 in some embodiments. Each reader 302 has a fixed number of ports for connecting antennas, each port connecting to a single antenna of the set of antennas 108. In some embodiments, there may be a plurality of readers 302 coupled to the computer system 110 based on the number of antennas 108 implemented.

As also shown in the system diagram 300, the computer system 110 is coupled to memory 240. The computer system 110 may store the signal information received from the reader 302 in the memory 240 and analyze the signal information to identify the identifier of each object 114 extracted. The memory 240 may also store operation information associated with each identifier specifying a set of operations to be performed for each object 114 extracted having the corresponding identifier, as described elsewhere herein.

The computer system 110 may also be communicatively coupled to the camera 134, as shown in the system diagram 300, for receiving video imaging the environment 100. The computer system 110 may receive video, captured by the camera 134, imaging a state of the environment 100, such as video depicting a presence of the plurality of objects 102 to be processed in the designated area 104, or depicting operation of the robotic manipulator 106 to extract the object 114 from the collected plurality of objects 102. The computer system 110 may control, based on video captured by the camera 134, emission of the RF interrogation signal(s) 130 based on a state of the designated area 104 and/or the robotic manipulator 106. In some embodiments, the computer system 110 may determine signal information received via the reader 302 that corresponds to time periods during which the robotic manipulator 106 is operating to extract the object 114 based on video captured and received from the camera 134. In some embodiments, the computer system 110 may be coupled to one or more sensors other than or in addition to the camera 134 to provide feedback indicating a state of the environment 100.

In some embodiments, the robotic manipulator 106 may provide information to the computer system 110 regarding a state of the environment 100. For example, the robotic manipulator 106 may provide a signal or information to the computer system 110 indicating detection by the robotic manipulator 106 of the presence of a plurality of objects 102 to be processed in the designated area 104. As another example, the robotic manipulator 106 may provide a signal or information indicating that the robotic manipulator 106 is extracting the object 114 or will extract the object 114 at a designated time in the future. As described above with respect to the camera 134, the computer system 110 may control emission of the RF interrogation signal(s) 130 or correlate signal information of received RF signals 118 with extraction of the object 114 based on signals or information received from the robotic manipulator 106.

The computer system 110 may be electrically communicatively coupled with one or more robots 304 other than the robotic manipulator 106 for causing performance of operations involving the object 114 extracted. In response to identifying the identifier of the transponder 116a of the object 114 extracted, the computer system 110 may send a communication, e.g., via the one or more networks 207 or via other communication protocol (Bluetooth, Zigbee), to a robot 304 indicating a set of operations to be performed involving the object 114. For instance, the communication from the computer system 110 may include instructions causing the robot 304 to retrieve the object 114 from a specified location or from the robotic manipulator 106, and deliver the object 114 to a specified location. As another example, the communication may include instructions that cause the robot 304 to assemble the object 114 with one or more other objects as part of a manufacturing process.

The computer system 110 may be electrically communicatively coupled to interact with and control devices 306, such as motors, actuators, valves, etc., for causing performance of operations involving the object 114 extracted. For instance, the computer system 110 may include or be coupled to control motors of a series of conveyors 308 to relocate the object 114 extracted from the environment 100 to a location corresponding to the identifier of the transponder 116a of the object 114.

Figure 4:
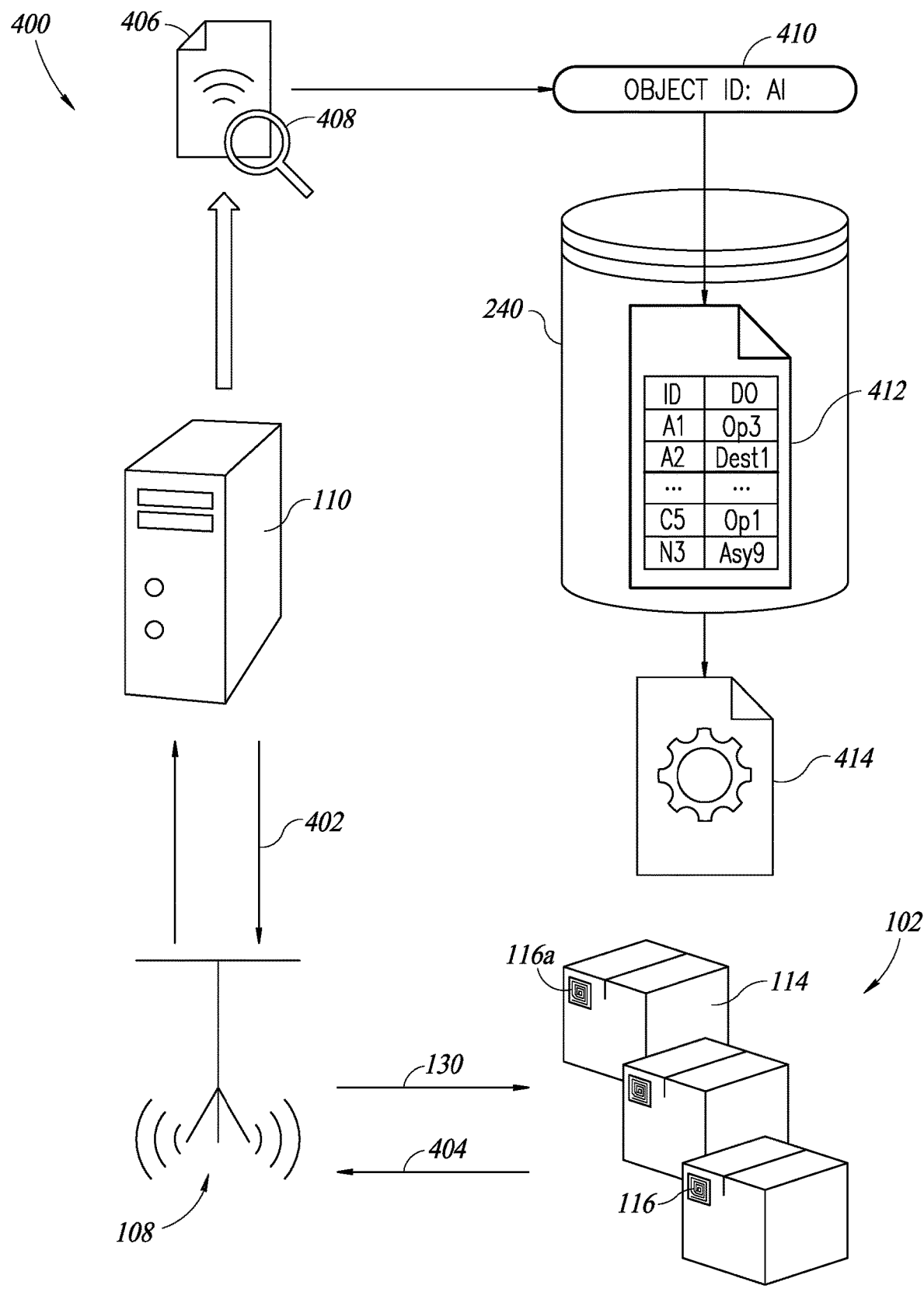
FIG. 4 is a diagram of a process for determining an operation to be performed as a result of identification of a manipulated object among a plurality of objects.

FIG. 4 shows a process 400 performed by the computer system 110 to identify the object 114 extracted from the plurality of objects 102 according to one or more embodiments. In connection with performance of the process 400, the computer system 110 may determine that a defined criterion is satisfied with respect to the environment 100. For example, the defined criterion may be satisfied in response to detection of the presence of the plurality of objects 102 is detected in the designated area 104. As another example, the defined criterion may be satisfied in response to an indication that the robotic manipulator 106 is processing or is about to begin processing the plurality of objects 102. The computer system 110 sends an electric signal, via the reader 302, causing the set of antennas 108 to emit the RF interrogation signal 130.

In response, the set of antennas 108 receive a plurality of RF reply signals 404 generated and emitted by the transponders 116 of the plurality of objects 102, including the transponder 116a of the object 114. The computer system 110 receives, via the reader 302, signal information 406 corresponding to the plurality of RF reply signals 404. The signal information 406 indicates information regarding each RF reply signal of the plurality of RF reply signals 404. Specifically, the signal information 406 indicates a signal characteristic of the RF reply signal (e.g., RSSI), and identifier encoded in the RF reply signal, and may indicate temporal information regarding a time at which the RF reply signal was received or time at which the corresponding RF interrogation signal 130 was emitted.

Each set of signal information 406 may include information regarding signals received by a plurality of antennas 108. For example, a first antenna and the second antenna may be coupled to the reader 302, which generates signal information 406 that includes first information regarding an RF reply signal received by the first antenna and second information regarding an RF reply signal received by the second antenna. The first information and the second information may specify, for the plurality of RF reply signals 404, the same set of identifiers and different information regarding signal characteristics as a result of the first antenna being positioned at a different location around the designated area 104 then the second antenna. As shown in the environment 100, for example, the antenna 108a is located on a first side of the designated area 104 whereas the antenna 108b is located on a second side of the designated area 104 opposite to the first side.

The computer system 110 may obtain several sets of the signal information 406 in connection with extraction of the object 114 from among the plurality of objects 102 by the robotic manipulator 106, each set of signal information 406 corresponding to a plurality of RF reply signals 404. The computer system 110 analyzes 408 the signal information 406 to detect a particular identifier 410 encoded in the plurality of RF reply signals 404 that is associated with a change in the signal characteristic over time. For instance, the computer system 110 may identify the particular identifier 410 as an identifier in a first set of signal information and a second set of signal information that is associated with different signal characteristic values. It is noted that the plurality of objects 102 may include objects of the same type as the object 114 and having a transponder 116 configured to emit the same identifier. The computer system 110 is configured to identify the object 114 emitting the RF response signal encoding the particular identifier 410 among other similar objects as discussed below.

In response to determining that the object 114 is associated with the particular identifier 410, the computer system 110 may determine one or more operations to be performed involving the object 114. Each object of the plurality of objects 102 has a transponder 116 that emits an RF reply signal encoding an identifier corresponding to a classification of the object, such as the type of object or the content of the object, as described above with respect to FIG. 1 and elsewhere herein. The plurality of objects 102 include a first set of objects of a first classification that have transponders transmitting signals encoding a first identifier. The plurality of objects 102 also include a second set of objects of a second classification that have transponders transmitting signals encoding a second identifier.

The memory 240 may store a data structure 412 indicating operations to be performed for each object classification. In the data structure 412, a set of operations may be defined, referenced, or associated with each object classification. A first set of operations may be associated with objects corresponding to the first identifier and a second set of operations may be associated with objects corresponding to the second identifier, the second set of operations including one or more operations different than the first set of operations. The set of operations for an object classification may, by way of non-limiting example, include information regarding a destination for the object; a series of operations to be performed by certain machinery, robots, or devices; which machinery, robots, or devices are to perform the operations; parameters for performing the operations; and/or communications to be sent. In response to identifying that an object 114 extracted by the robotic manipulator 106 is of a particular classification, the computer system 110 may reference the data structure 412 to obtain operation instructions 414 that the computer system 110 implements to cause performance of the operations.

Figure 5:
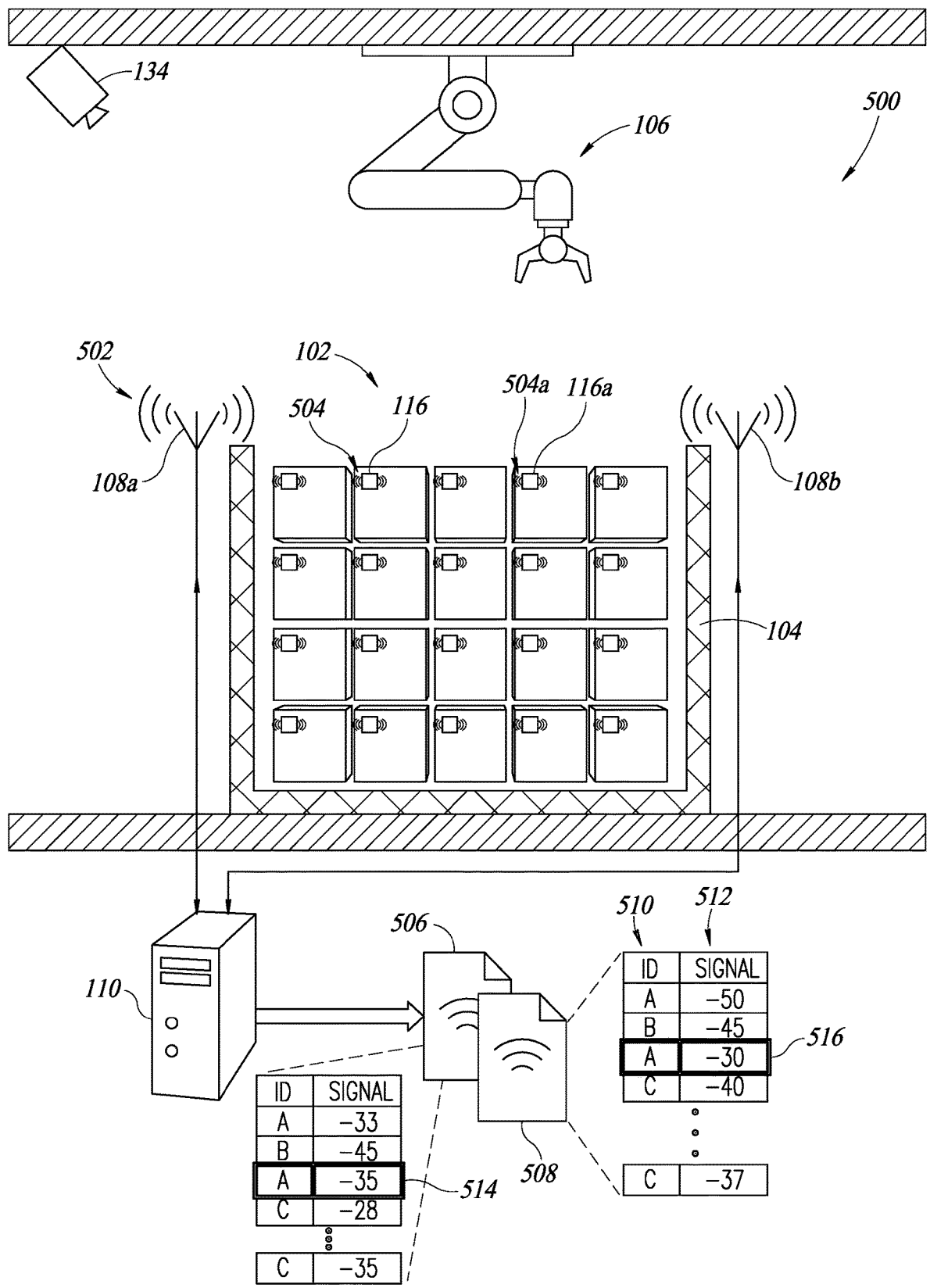
FIG. 5 is a diagram of a first state of the environment of FIG. 1.

FIG. 5 shows a state 500 of the environment 100 during a time period prior to extraction of the plurality of objects 102 by the robotic manipulator 106 from the designated area 104 according to one or more embodiments. In the state 500, the computer system 110 obtains signal information regarding RF signals emitted by the transponders 116 of the plurality of objects 102. The computer system 110 may obtain the signal information for the state 500 of FIG. 5 in response to determining that extraction by the robotic manipulator 106 will soon commence. In some implementations, the computer system 110 may obtain signal information in response to detecting the presence of the plurality of objects 102 in the designated area 104 based on video received from the camera 134 or other sensor. In some implementations, the computer system 110 may obtain the signal information based on an indication that the robotic manipulator 106 is about to process the plurality of objects 102—for example, based on a communication from the robotic manipulator 106 or based on a communication from another system.

The computer system 110 causes the set of antennas 108 to emit first RF interrogation signal(s) 502 over a time period T1. The transponders 116, in response, each emit an RF reply signal 504 over a time period T2 after the time period T1, the RF reply signal 504 encoding an identifier corresponding to the classification, type, content, etc., of the object of the transponder. The computer system 110 receives the RF reply signal(s) 504 emitted by each transponder 116 via the set of antennas 108 and generates signal information regarding the RF reply signals 504 received. The computer system 110, via the reader 302, generates a set of signal information 506 corresponding to the RF reply signals 504 received by the first antenna 108a and generates a set of signal information 508 corresponding to the RF reply signals 504 received by the second antenna 108b.

The sets of signal information 506 and 508 are data array structures that include a first collection of elements 510 storing identifiers encoded in the RF reply signals 118 received in response to the RF interrogation signal 502. The sets of signal information 506 and 508 also include a second collection of elements 512 storing values representing a detected signal characteristic of the RF reply signals 118 received in response to the RF interrogation signal 502. The sets of signal information 506 and 508 may store or have associated therewith elements for other information. For example, the signal information 506 may indicate that the information stored therein is based on RF reply signals 118 received by the first antenna 108a, and the signal information 508 may indicate that the information stored therein is based on RF reply signals 118 received by the second antenna 108b. The signal information 506 and 508 may also include temporal information indicating a time at which the RF reply signals 118 were received, a time at which the RF interrogation signal 502 was emitted, or other information indicating a time period for the state 500. Although the sets of signal information 506 and 508 are shown as being separate data arrays, the sets of signal information 506 and 508 may be combined into a single data array in which the respective elements of each array is preserved to indicate the corresponding antenna for element and temporal information of the data.

Figure 6:
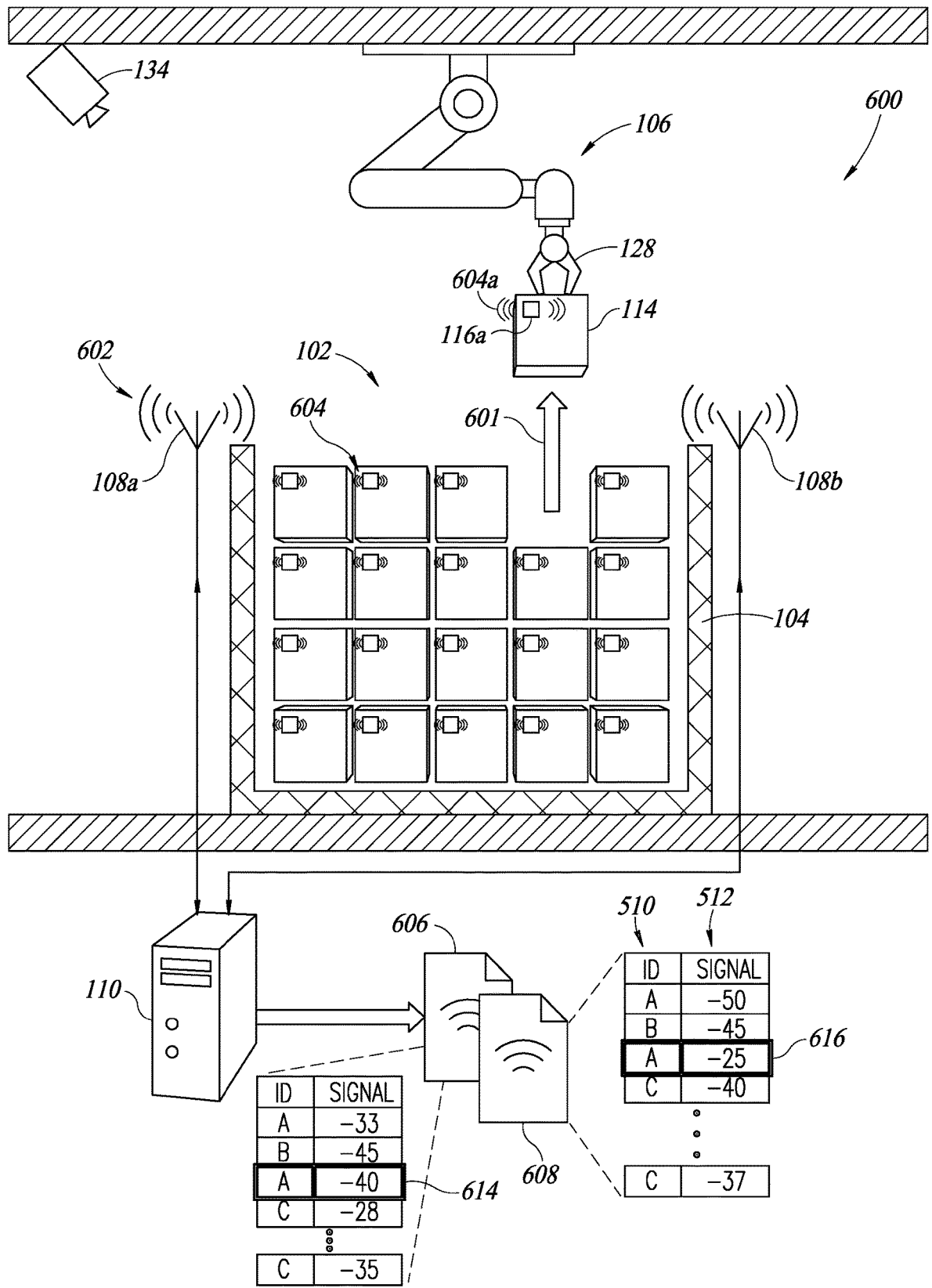
FIG. 6 is a diagram of a second state of the environment of FIG. 1.

FIG. 6 shows a state 600 of the environment 100 during a time period after the state 500 according to one or more embodiments. In the state 600, signal information is obtained regarding RF reply signals received by the set of antennas 108 during extraction of the object 114 of the plurality of objects 102 in the designated area 104. The computer system 110 may obtain the signal information for the state 600 of FIG. 6 during extraction of the object 114. In particular, the state 600 represents a time period in which the end-effector 128 possesses the object 114, and the robotic manipulator 106 is actively moving the object 114 relative to the plurality of objects 102 (e.g., in an upward direction 601). In some implementations, computer system 110 may detect that the robotic manipulator 106 is extracting the object 114 based on video received from the camera 134 or measurements by one or more other sensors. In some implementations, the computer system 110 may obtain the signal information in the state 600 in response to a communication or other signal indicating that the robotic manipulator 106 is extracting or beginning to extract the object 114.

In the state 600, the computer system 110 causes the set of antennas to emit second RF interrogation signal(s) 604 over a time period T3 after the time period T2 of the state 500. In response, the transponders 116 each emit an RF reply signal 604 over a time period T4 after the time period T3. As described with respect to the state 500, the RF reply signals 604 encode an identifier corresponding to the classification of the corresponding object. The RF reply signal 604a encodes an identifier corresponding to the classification of the object 114. The computer system 110 receives the RF reply signal(s) 604 (including the RF reply signal 604a) via the set of antennas 108 and generates signal information regarding the RF reply signals 604 received. The computer system 110, via the reader 302, generates a set of signal information 606 corresponding to the RF reply signals 604 received by the first antenna 108a and generates a set of signal information 608 corresponding to the RF reply signals 604 received by the second antenna 108b.

The set of signal information 606 and 608 are data array structures substantially similar to the sets of signal information 506 and 508 described with respect to the state 500. The identifiers stored in the first collection of elements 510 of the signal information 606 and 608 are identical to the identifiers stored in the sets of signal information 506 and 508. The values stored for the second collection of elements 512 of the signal information 606 and 608 are similar to those in the sets of signal information 506 and 508, with the exception of the values representing the detected signal characteristic of the RF reply signal 604a. In particular, the signal information 606 and 608 include values of the signal characteristic, such as RSSI, for the transponder 116a of the object 114 that are different relative to the values of the signal characteristic stored in the signal information 506 and 508 for the transponder 116 as a result of a difference in the physical location of the object 114 relative to each of the antennas 108a and 108b.

Examining the stored values of the signal information 506 and 606, the computer system 110 may detect that a value for the signal characteristic in an element 614 of the signal information 606 is different than a value for the signal characteristic in an element 514 of the signal information 506. The computer system 110 may also detect that a value for the signal characteristic in an element 616 of the signal information 608 is different than a value for the signal characteristic in an element 516 of the signal information 508.

The computer system 110 may store instructions including logic to detect the difference or differences in the value between corresponding sets of signal information and determine an identifier of a transponder 116 corresponding to the difference(s). For example, the computer system 110 may observe that a value for the element 614 is different than a value for the element 514, and that both values are associated with the same identifier "A" in the signal information 506 and 606. The computer system 110 may observe that a value for the element 616 is different than a value for the element 516, and that both values are associated with the same identifier "A" in the signal information 508 and 608. The computer system 110 may further identify that the same identifier "A" is associated with both differences in values.

The computer system 110 may determine the identifier or object classification associated with the object 114 based on a difference in signal characteristic value between one or more first values of a static or non-motion state in which the robotic manipulator 106 is not extracting the object 114 (e.g., the state 500), and one or more second values of a dynamic or moving state in which the robotic manipulator is extracting the object 114 (e.g., the state 600). The computer system 110 may be configured to determine the identifier or object classification based on a difference in signal characteristic value between one or more first values of a first moving state and one or more second values of a second moving state.

Figure 7:
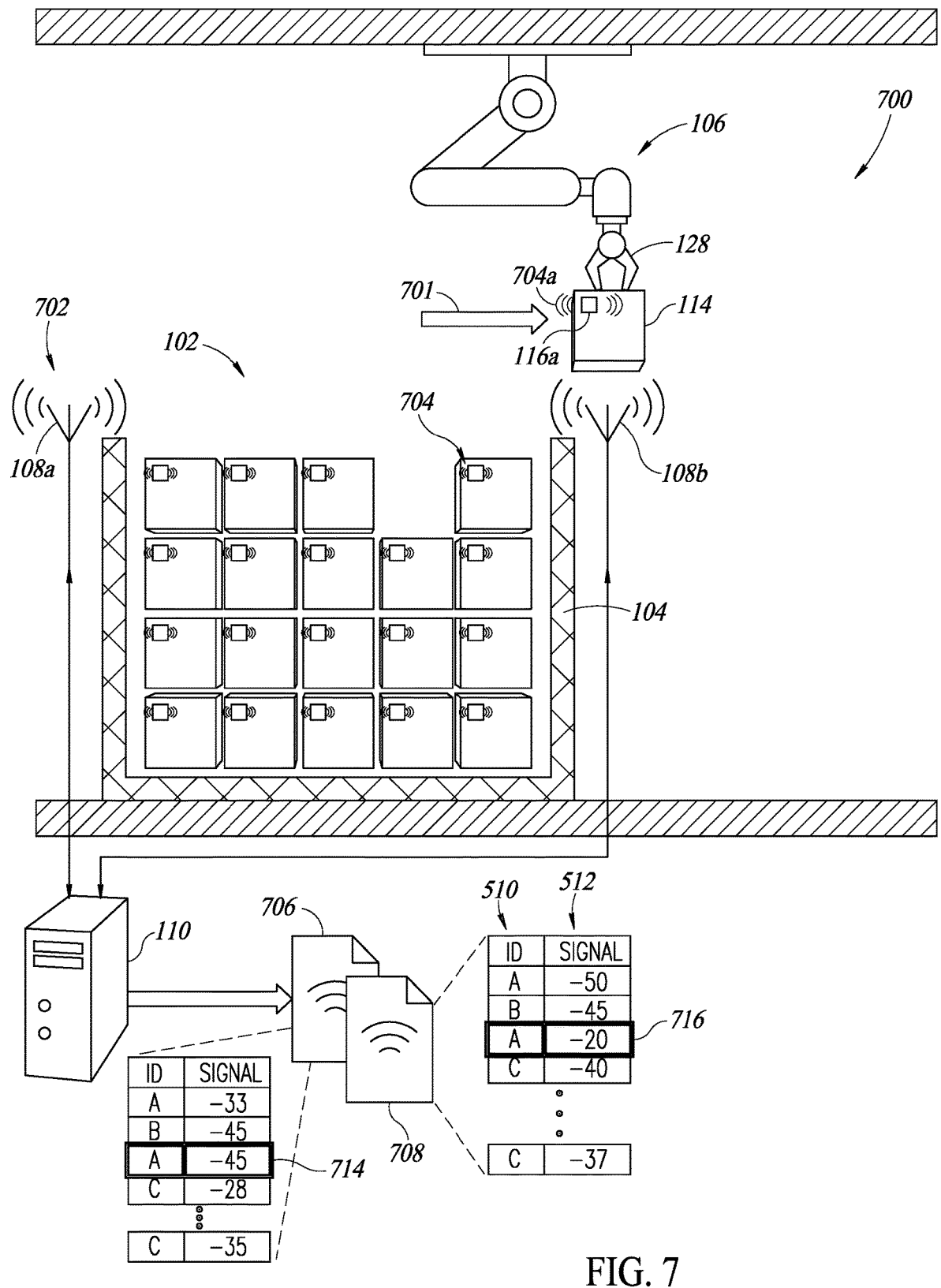
FIG. 7 is a diagram of a third state of the environment of FIG. 1.

FIG. 7 shows a state 700 of the environment 100 during a time period after the state 600 according to one or more embodiments. In the state 700, signal information is obtained regarding RF reply signals received by the set of antennas 108 during extraction of the object 114. In particular, the state 700 represents a time period in which the end-effector 128 possesses the object 114, and the robotic manipulator 106 is actively moving the object 114 relative to the plurality of objects 102 after the state 600. The robotic manipulator 106 is shown in the state 700 as moving the object 114 in a lateral direction 701. The state 600 and the state 700 may represent part of a single operation for extracting the object 114 in which the object 114 is extracted in a continuous motion or several discrete motions by the robotic manipulator 106. During the state 700, the computer system 110 obtains signal information during extraction of the object 114.

In the state 700, the computer system 110 causes the set of antennas to emit second RF interrogation signal(s) 704 over a time period T5 after the time period T4 in the state 600. In response, the transponders 116 each emit an RF reply signal 704 over a time period T6 after the time period T5. As described with respect to the state 500 and elsewhere, the RF reply signals 704 encode an identifier corresponding to the classification of the corresponding object. The RF reply signal 704a encodes an identifier corresponding to the classification of the object 114. The computer system 110 receives the RF reply signal(s) 704 (including the RF reply signal 704a) via the set of antennas 108 and generates signal information regarding the RF reply signals 704 received. The computer system 110, via the reader 302, generates a set of signal information 706 corresponding to the RF reply signals 704 received by the first antenna 108a and generates a set of signal information 708 corresponding to the RF reply signals 704 received by the second antenna 108b.

The values stored for the second collection of elements 512 of the signal information 706 and 708 are similar to those in the sets of signal information 606 and 608, with the exception of the values representing the detected signal characteristic of the RF reply signal 704a. In particular, the signal information 706 and 708 include values of the signal characteristic for the transponder 116a of the object 114 that are different relative to the values of the signal characteristic stored in the signal information 606 and 608 (and different than the values of the signal characteristic in the signal information 506 and 508) for the transponder 116 as a result of a difference in the physical location of the object 114 relative to each of the antennas 108a and 108b.

The signal information 706 and 708 include values of the signal characteristic for the transponder 116a of the object 114 that are different than the values of the signal characteristic stored in the signal information 506 and 508. Implementing the logic discussed above with respect to the state 600, the computer system 110 may observe that the values for the element 714 is different than a value for the element 714, and further observed that both values are associated with the same identifier "A" in the signal information 606 and 706. The computer system 110 may observe that a value for the element 716 is different than a value for the element 616, and that both values are associated with the same identifier "A" in the signal information 608 and 708. The computer system 110 may further identify that the same identifier "A" is associated with both differences in values. Based on the correspondence of the identifiers and the differences in signal characteristic values in different motion states, the computer system 110 may determine the identifier or object classification of the object 114 as it is being extracted by the robotic manipulator 106.

In some embodiments, the computer system 110 may be configured to determine an identifier or classification of the object 114 based on comparison of two static or non-motion states of the environment 100 before and after extraction of the object 114. For instance, the computer system 110 may obtain the signal information 506 and 508 as described with respect to FIG. 5. Then, after the robotic manipulator 106 has extracted the object 114 from the plurality of objects 102 and is holding the object 114 in a static non-moving state, the computer system 110 may obtain additional signal information regarding RF reply signals received by the set of antennas 108. The computer system 110 may then compare the identifiers and signal characteristic values for the signal information 506 and 508 in the additional signal information and determine the identifier of the object 114 extracted based on differences in the signal characteristic values before and after extraction of the object 114.

Figure 8:
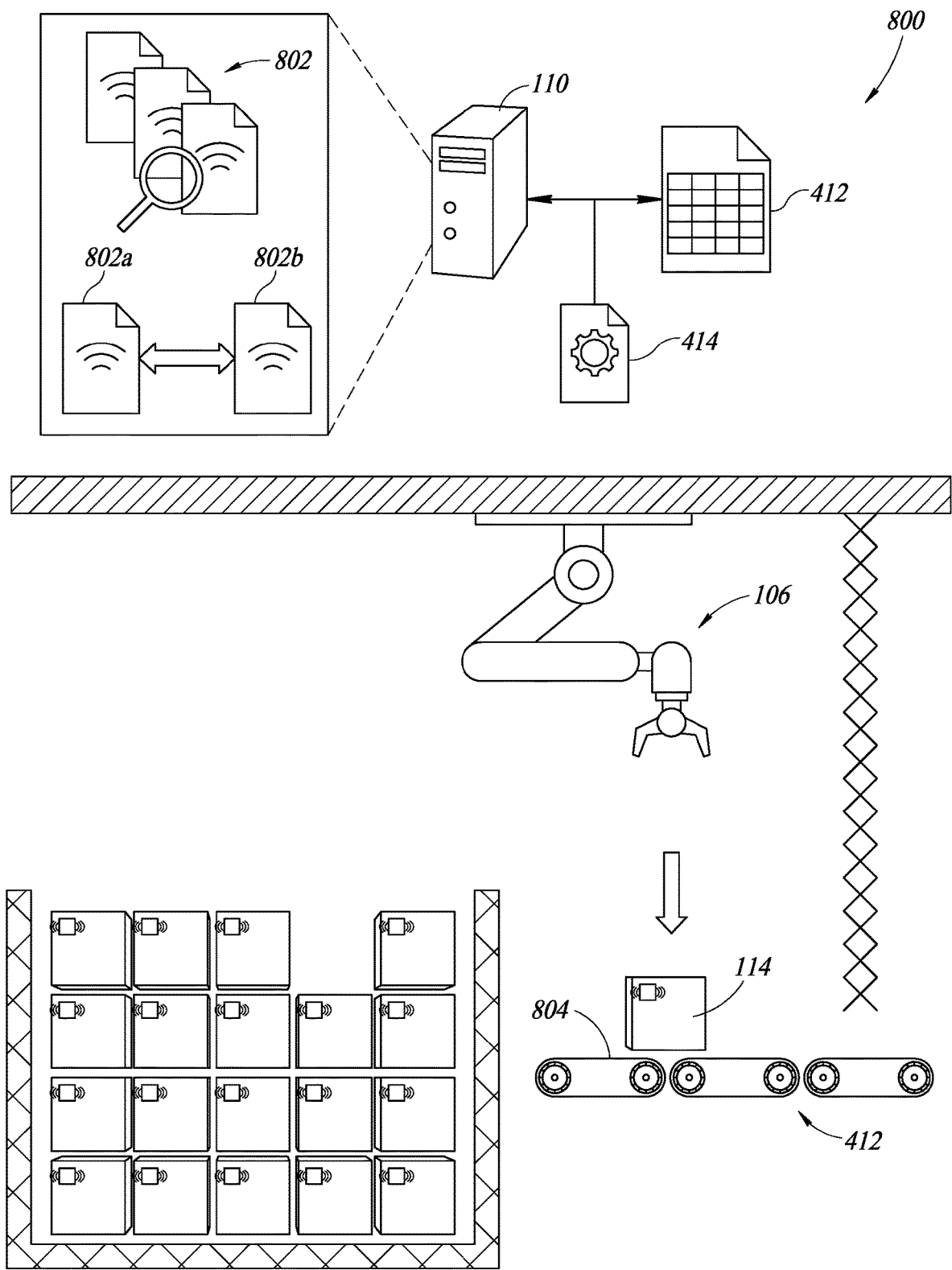
FIG. 8 is a diagram of a fourth state of the environment of FIG. 1.

FIG. 8 shows a state 800 of the environment 100 during a time period after the computer system has obtained signal information for two or more time periods associated with extraction of the object 114. In the state 800, the computer system 110 has obtained sets of signal information 802 that includes signal information obtained in two or more time periods. After the computer system 110 has obtained sufficient collection of signal information 802, the computer system 110 may compare a first set of signal information 802a obtained during a first time period with a second set of signal information 802b obtained during a second time period to determine the identifier or object classification of the object 114 extracted. In some embodiments, the first set of signal information 802a may include signal information for RF reply signals received by a plurality of antennas, which is compared with corresponding signal information for RF reply signals received by the plurality of antennas in the second set of signal information 802b.

As a result of determining the identifier or object classification of the object 114 extracted, the computer system 110 in the state 800 references the data structure 412 stored in the memory 240 and obtains operation instructions 414 corresponding to the identifier or object classification of the object 114. As shown in the state 800, the computer system 110, according to the operation instructions 414, may cause the robotic manipulator 106 to maneuver the object 114 to a particular location 804 specified or referenced in the operation instructions 414 and release or deposit the object 114 at the particular location 804. The computer system 110 may further control machinery or devices, such as a series of conveyors 806, to advance the object 114 to a destination indicated in the operation instructions 414.

Figure 9A:
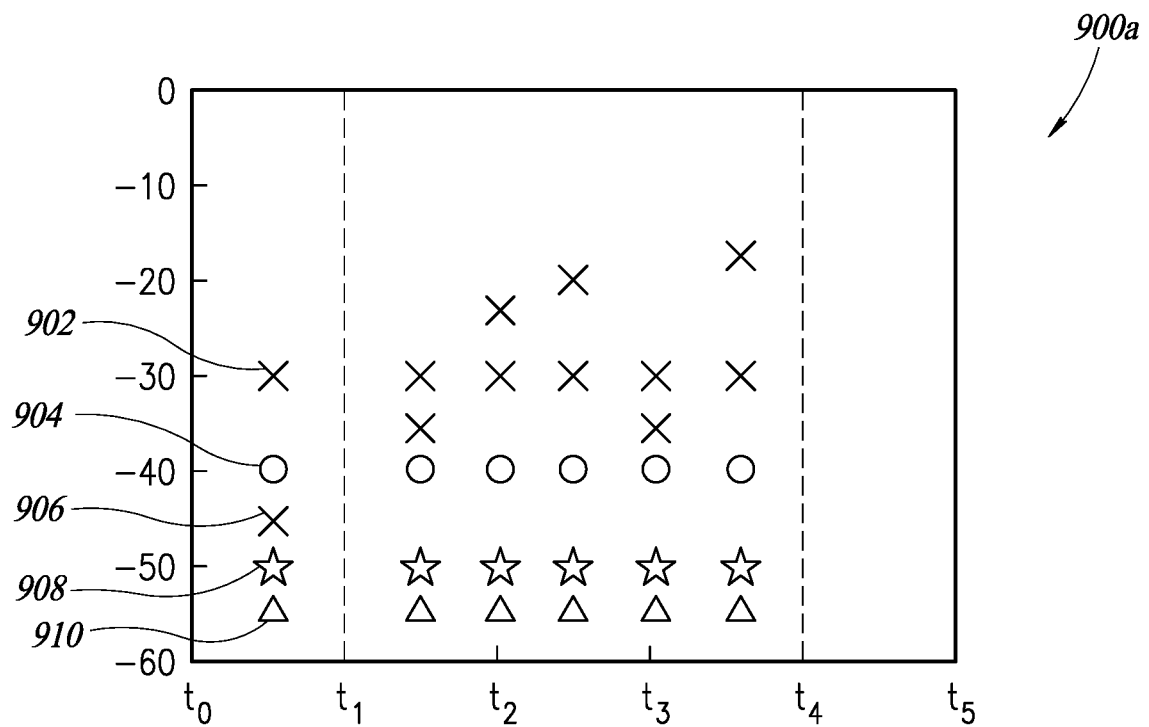
FIG. 9A is a representation of information corresponding to radiofrequency (RF) signals received by a first antenna of the environment of FIG. 1.
Figure 9B:
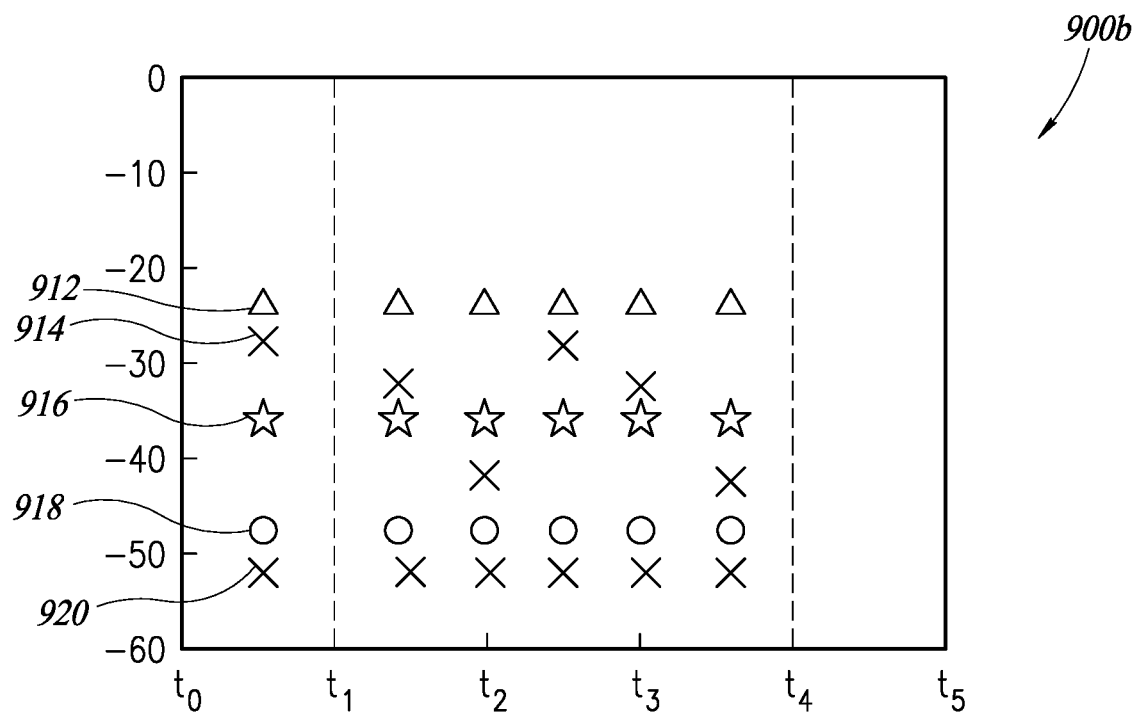
FIG. 9B is a representation of information corresponding to radiofrequency (RF) signals received by a second antenna of the environment of FIG. 1.

FIG. 9A shows a representation 900a of a plurality of sets of signal information obtained by a first antenna over a period of time. FIG. 9B shows a representation 900b of a plurality of sets of signal information obtained by a second antenna over the period of time. The first antenna and the second antenna are spaced apart from each other in may be located on different sides of an area in which objects are to be extracted, such as the designated area 104. The first antenna and the second antenna may be located on opposite sides of the designated area 104—for instance, the first antenna may be the antenna 108a and the second antenna may be the antenna 108b shown in the environment 100.

The signal information in the representation 900a and the representation 900b represents a plurality of objects having transponders that emit different identifiers in the environment 100. The representation 900a includes an icon 902 representing an object that has a transponder emitting a signal encoding a first identifier, an icon 904 representing an object that has a transponder emitting a signal encoding a second identifier, an icon 906 representing an object that has a transponder emitting a signal encoding the first identifier, an icon 908 representing an object that has a transponder emitting a signal encoding a third identifier; and an icon 910 representing an object that has a transponder emitting a signal encoding a fourth identifier.

In the representation 900a, a first antenna receives sets of RF reply signals over a time period from transponders of the objects represented by the icons 902, 904, 906, 908, and 910. The computer system 110, via the reader 302, generates a set of signal information for each set of RF reply signals received. As shown in the representation 900a, a first set of signal information is obtained at the time $t_1$, a second set of signal information is obtained at a time $t_3$, a third set of signal information is obtained at a time $t_4$, a fourth set of signal information is obtained at a time $t_5$, a fifth set of signal information is obtained at a time $t_6$, and a sixth set of signal information is obtained at a time $t_7$. Between the times to and $t_2$, the environment 100 is in the state 500 in which the robotic manipulator 106 is not extracting the object 114, as discussed with respect to FIG. 5. The environment 100 between the time $t_2$ and the time $t_8$ is in a state in which the robotic manipulator 106 is in possession of and moving the object 114.

The computer system 110 analyzes the signal information in the representation 900a to determine an identifier corresponding to the object 114 being manipulated. The computer system 110 may analyze two or more sets of the signal information during extraction of the object 114, such as the signal information at the times $t_3$ and $t_4$, to determine the identifier of the object 114 according to defined instructions executed by the processor(s) 238 of the computer system 110. The computer system 110 may be configured to compare the signal information for a static state of the environment 100 (i.e., at the time $t_1$) with signal information for one or more dynamic state of the environment 100 (i.e., at times after the time $t_2$) to identify the object 114 by determining differences between the signal characteristic values for the static state and the dynamic state.

As a first step in analyzing the signal information, the computer system 110 adds, for each set of signal information, the signal characteristic values for each identifier type into an aggregate value for the identifier type. For example, for the set of signal information for the time $t_3$, the computer system 110 adds the signal characteristic values for the icon 902 and the icon 906 into a first aggregate value, the icon 902 and the icon 906 being of the same signal identifier type. The computer system 110 also adds, for the set of signal information of the time $t_4$, the signal characteristic values of the icon 902 and the icon 906 into a second aggregate value. For other identifier types, the signal characteristic values are also added together into a separate aggregate value for the identifier types; however, no other identifier type shown in the representation 900 includes more than one RF reply signal information, so the first step may be concluded for the representation 900a upon aggregating the signal characteristic values for the identifier type of the icons 902 and 906.

At the next step, the computer system 110 compares the aggregate values or the single values for each identifier type. Comparing the values or the aggregate values may include determining a difference between the aggregate values or single values for each identifier type. For instance, the computer 110 may determine that a difference between the signal characteristic value of the icon 910 at the time $t_3$ and the signal characteristic value of the icon 910 at the time $t_4$ is zero or close to zero. Differences between the signal characteristic values of the icon 908 and the signal characteristic values of the icon 904 are also zero or close to zero.

The difference in aggregated values for the identifier type of the icons 902 and 906 between the time $t_3$ and $t_4$ is approximately 10. The computer system 110 may compare the difference in aggregated values for different times with a defined threshold. As a result of the difference in aggregated values exceeding the defined threshold, the computer system 110 determines that the object 114 has the identifier type corresponding to the difference exceeding the defined threshold. For instance, referring back to the representation 900a, the defined threshold may be of value of 1, and the computer system 110 may therefore identify the object 114 extracted as having the first identifier corresponding to the icons 902 and 906 based on the difference in aggregated value of 10 exceeding the defined threshold. The computer system 110 may obtain and compile difference values of the object 114 to determine information regarding a trajectory of the object 114 over time.

In some embodiments, the computer system 110 may use signal information of an RF reply signal received by a second antenna. Referring to FIG. 9B, the representation 900b includes signal information regarding an RF reply signal received by the second antenna 108b, which may be used to improve a confidence in the identifier determined for the object 114, or be used to determine other information regarding the object 114, such as a location, speed, acceleration, or direction of the object 114.

The representation 900b includes an icon 912 representing an object that has a transponder emitting a signal encoding the fourth identifier, an icon 914 representing an object that has a transponder emitting a signal encoding the first identifier, an icon 916 representing an object that has a transponder emitting a signal encoding the third identifier, a third icon 918 representing an object that has a transponder emitting a signal encoding a second identifier; and an icon 920 representing an object that has a transponder emitting a signal encoding a fourth identifier.

The computer system 110 may perform the operations described above with respect to FIG. 9A to determine a confidence regarding identification of the identifier of the object 114. For instance, the computer system 110 may aggregate the signal characteristic values for the icons 912, 914, 916, 918, and 920 over a two or more times $t_1$, $t_2$, . . . , $t_N$ and confirm the identifier of the object 114. The computer system 110 may also compile the differences between the signal information for two or more times $t_1$, $t_2$, . . . , $t_N$, and determine information regarding movement of the object 114. The differences between signal information for the representation 900a may be compared with the differences for the signal information for the representation 900b to determine a direction of the object, a speed of the object, acceleration of the object, etc. For example, the computer system 110 may determine the signal characteristic values for the object 114 in the representation 900a are increasing over the times $t_1$, $t_2$, . . . , $t_N$, and that the signal characteristic values for the object 114 in the representation 900b are decreasing over the times $t_1$, $t_2$, . . . , $t_N$. As a result of the relative increases and decreases in signal characteristic values, the computer system 110 may determine that the object 114 is moving in a direction toward the first antenna and in a direction away from the second antenna.

Figure 10A:
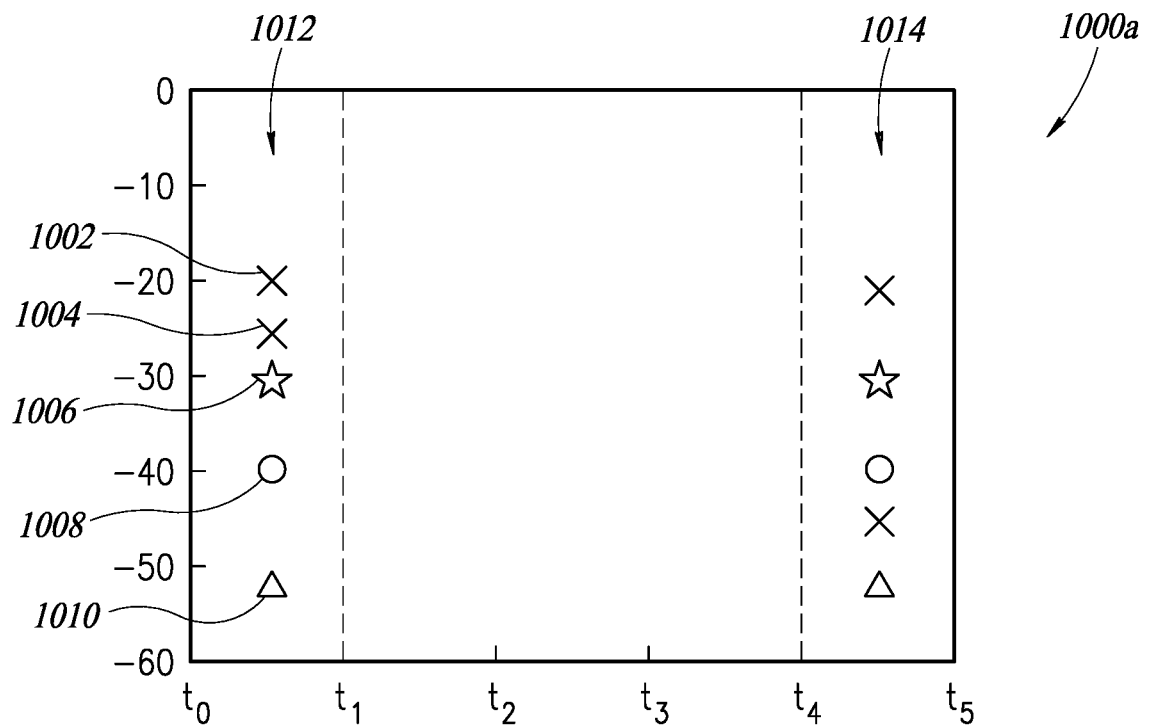
FIG. 10A is a representation of information corresponding to radiofrequency (RF) signals received by a first antenna of the environment of FIG. 1.
Figure 10B:
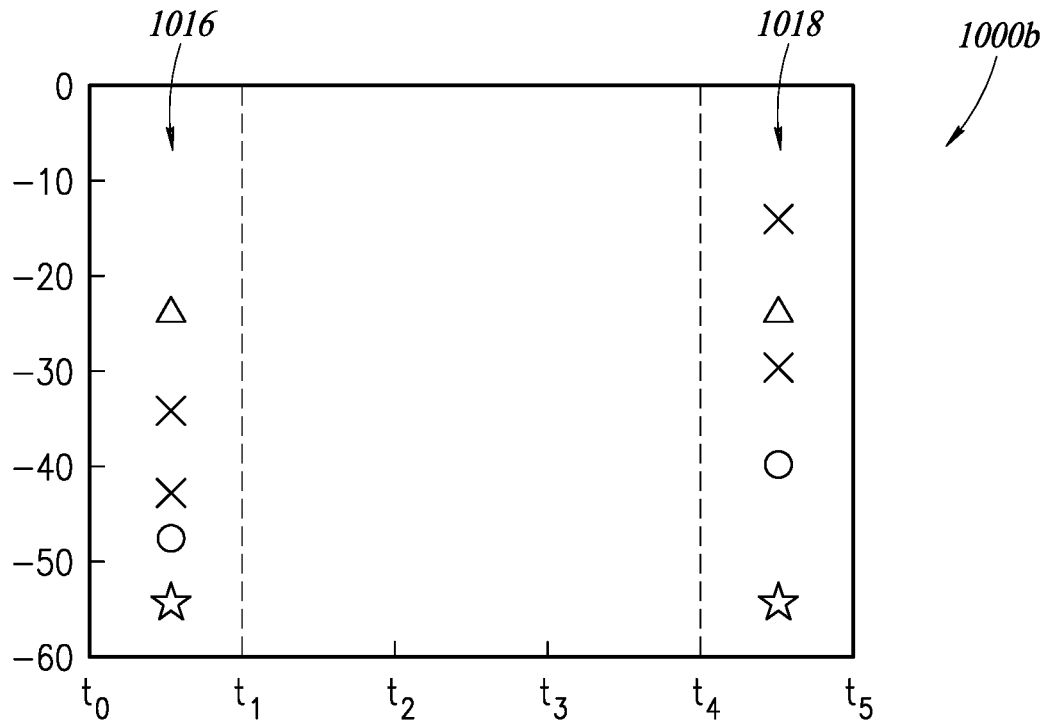
FIG. 10B is a representation of information corresponding to radiofrequency (RF) signals received by a second antenna of the environment of FIG. 1.

In some embodiments, the computer system 110 may identify the object 114 based on comparison of two static or non-motion states of the environment 100. FIG. 10A shows a representation 1000a of a plurality of sets of signal information obtained by a first antenna over a period of time. FIG. 10B shows a representation 1000b of a plurality of sets of signal information obtained by a second antenna over the period of time. The first and second antenna may be spaced apart from each other and are located on different sides of the designated area 104, as described elsewhere herein. The representations 1000a and 1000b include an icon 1002 representing an object that has a transponder emitting a signal encoding a first identifier, an icon 1004 representing an object that also has a transponder emitting the signal encoding the first identifier, an icon 1006 representing an object that has a transponder emitting a signal encoding a second identifier, an icon 1008 representing an object that has a transponder emitting a signal encoding a third identifier, and an icon 1010 representing an object that has a transponder emitting a signal encoding a fourth identifier.

In the representations 1000a and 1000b, signal information is captured for a time $t_1$ at which the object 114 is in a nonmoving state such that the object 114 is not being extracted or otherwise moved by the robotic manipulator 106. The computer system 110 obtains a first set of signal information 1012 at the time $t_1$ during which the object 114 is in a static or nonmoving state. At a time $t_2$, the robotic manipulator 106 begins to extract or move the object 114 from the plurality of object 102 to a different position. At a time $t_3$, the robotic manipulator 106 returns to the nonmoving state to wait instructions. The robotic manipulator 106, at the time $t_3$, may be in possession of the object 114. The computer system 110 obtains a second set of signal information 1014 at the time $t_3$ during which the object 114 is in a static or nonmoving state. The computer system 110 may then compare signal characteristic values between the first set of signal information 1012 and the second set of signal information 1014, as described above with respect to the representations 900a and 900b, to determine the object 114 that was manipulated during a time period between $t_2$ and $t_3$.

The computer system 110 may also obtain a third set of signal information 1016 regarding signals received by the second antenna at the time $t_1$ and also obtain a fourth set of signal information 1018 regarding signals received by the second antenna at the time $t_3$. The computer system 110 may then compare signal characteristic values between the third set of signal information 1016 and the fourth set of signal information 1018, as described above with respect to the representations 900a and 900b, to improve confidence regarding the object 114 identified based on signal characteristic differences determined as described with respect to the representation 1000a the object 114 that was manipulated during a time period between $t_2$ and $t_3$. The computer system may compare signal characteristic values between the third set of signal information 1016 and the fourth set of signal information 1018 to determine further information regarding the object 114, such as a location of the object 114.

Figure 11:
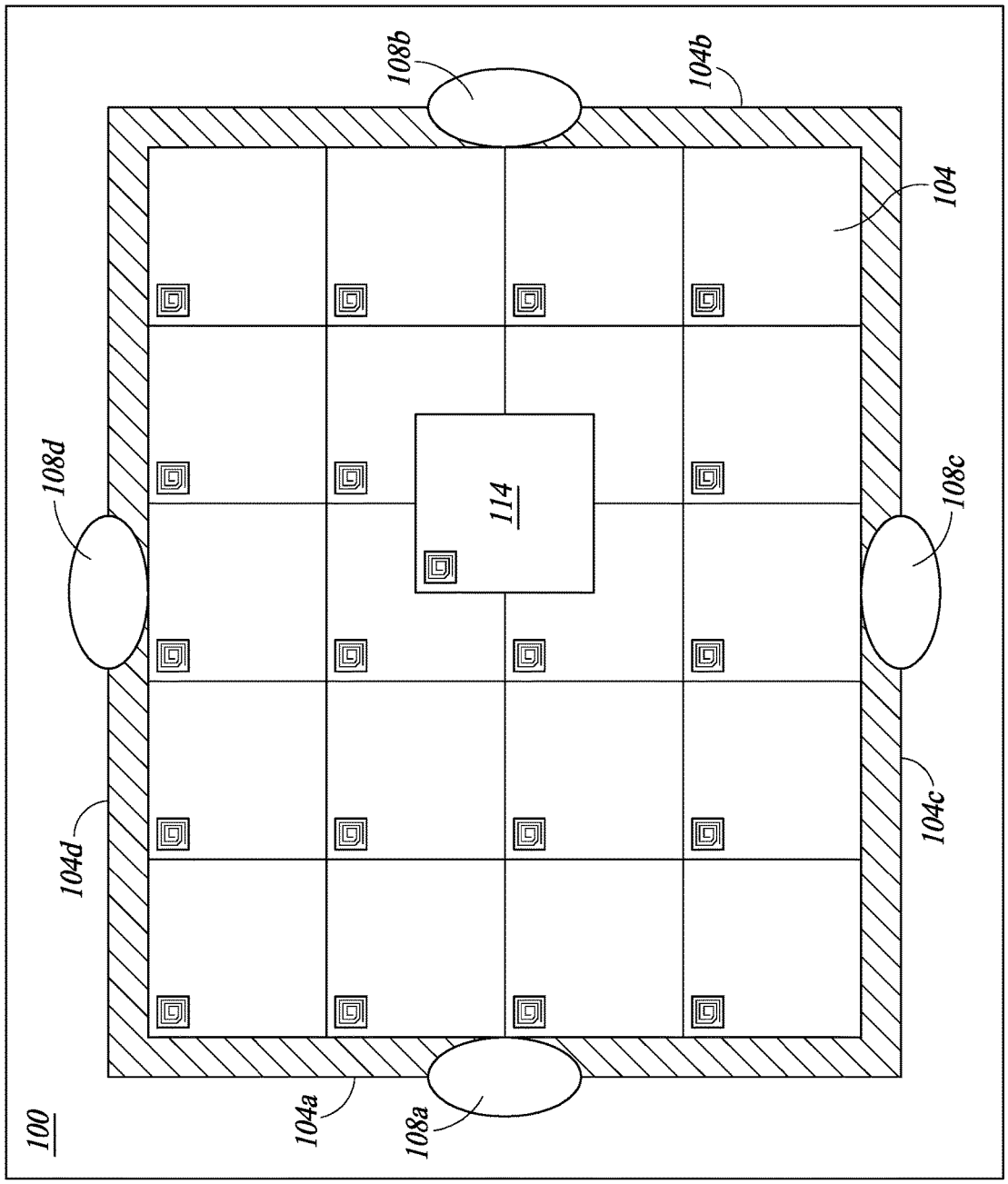
FIG. 11 is an overhead view of the environment of FIG. 1 that includes a plurality of antennas.

FIG. 11 shows an overhead view 1100 of the environment 100 that includes a plurality of antennas 108 arranged around the designated area 104. The environment 100 includes the antenna 108a and the antenna 108b shown in and discussed with respect to FIG. 1 and elsewhere herein. The antenna 108a is located at a first side 104a of the designated area 104 and the antenna 108b is located at a second side 104b opposite to the first side 104a. The computer system 110 is configured to control the antennas 108a and 108b to obtain signal information for identifying the object 114.

In some embodiments, the environment 100 includes an antenna 108c located at a third side 104c of the designated area 104 and includes an antenna 108d located at a fourth side 104d of the designated area 104 opposite to the third side 104c. Each of the antennas 108c and 108d are transversely located relative to the antennas 108a and 108b. The third side 104c and the fourth side 104d on which the antennas 108c and 108d are respectively located extend transversely relative to the first side 104a and the second side 104b. As a result of the transverse location of the antennas 108c and 108d relative to the antennas108a and 108b, the reply signals received by the antennas 108c and 108d may have different signal characteristics than the signal characteristics of the RF reply signals received by the antennas 108a and 108b.

For example, the object 114 shown in the view 1100 is positioned closer to the antenna 108b than the antenna 108a. A signal characteristic (e.g., signal strength) of a reply signal received by the antenna 108b may be different than a signal characteristic of the reply signal received by the antenna 108a. Based on the relative signal characteristics, the computer system 110 may determine that the object 114 is closer to the antenna 108b than the antenna 108a. The transverse location of the antennas 108c and 108d enable the computer system 110 to determine information about the object 114 along an axis or direction transverse to direction or axis along which the antennas 108a and 108b are located. In the situation shown in the view 1100, the signal characteristics of reply signals emitted by the transponder 116 of the object 114 received by the antennas 108c and 108d may be similar due to the position of the object 114 approximately halfway between the antennas 108c and 108d. The computer system 110 may therefore determine or estimate the location of the object 114 based on the signal characteristics detected by the antennas 108.

The location of an antenna as being "transverse" or located "transversely" refers to a position of the antenna as being not directly across from another antenna. Transverse location therefore may apply to different geometries of the designated area 104 or the positions of the antennas 108 within the environment 100. For example, the antennas 108 may be arranged in a circular geometry around the designated area 104, and antennas in the circular geometry that are not directly across from each other may be considered as being transversely located.

The computer system 110 is configured to control the antennas 108c and 108d to obtain signal information regarding RF reply signals transmitted by the transponders 116 of the plurality of objects 102. The signal information obtained by the computer system 110 based on the RF reply signals received by the antennas 108c and 108d includes identifiers and signal characteristic values for each RF reply signal received from an object of the plurality of objects 102. The computer system 110 may obtain signal information of RF reply signals received by the antennas 108c and 108d, in the use the signal information to improve confidence regarding the detection of the object 114 or determine additional information regarding the object 114, such as a direction in which the object 114 is being moved by the robotic manipulator 106.

In particular, the computer system 110 may use signal information corresponding to RF reply signals received by the antennas 108c and 108d in a manner similar to the representations 900a and 900b. The computer system 110 may determine a direction, speed, or acceleration of the object 114 being moved by the robotic manipulator 106 based on differences in a signal characteristic value in the signal information for the antennas 108c and 108d. The computer system 110 may control operation of the antennas 108a and 108b according to a first timing, and control operation of the antennas 108c and 108d according to a second timing. The computer system 110, for example, may cause an RF interrogation signal to be emitted by one or more of the antennas 108 over a first time period. Then, the computer system 110 may obtain first signal information regarding RF reply signals received by the antennas 108a and 108b over a second time period from the transponders of the plurality of objects 102. The computer system 110 may then cause an RF interrogation signal to be emitted by one or more of the antennas 108 over a third time period. Next, the computer system 110 may obtain second signal information regarding RF reply signals received by the antennas 108c and 108d over a fourth time period from the transponders of the plurality of objects 102. The computer system 110 may analyze the first signal information, as described with respect to FIGS. 9A, 9B, 10A, 10B, and elsewhere herein, to determine motion characteristics (e.g., such as speed, acceleration, location) of the object 114 along a first axis extending between the antennas 108a and 108b. The computer system 110 may analyze the second signal information, as also described with respect to FIGS. 9A, 9B, 10A, 10B, and elsewhere herein, to determine motion characteristics (e.g., such as speed, acceleration, location) of the object 114 along a second axis extending between the antennas 108c and 108d. In the environment 100 shown in FIG. 11, the designated area 104 has a rectangular geometry and, as a result, the second axis is orthogonal to the first axis. In some embodiments, the antennas 108 may be arranged in a different configuration or geometry around the designated area 104—for example, in a circular geometry or a polygonal geometry. The antennas 108 may be arranged according to a geometry of the designated area 104 in some embodiments.

Figure 12:
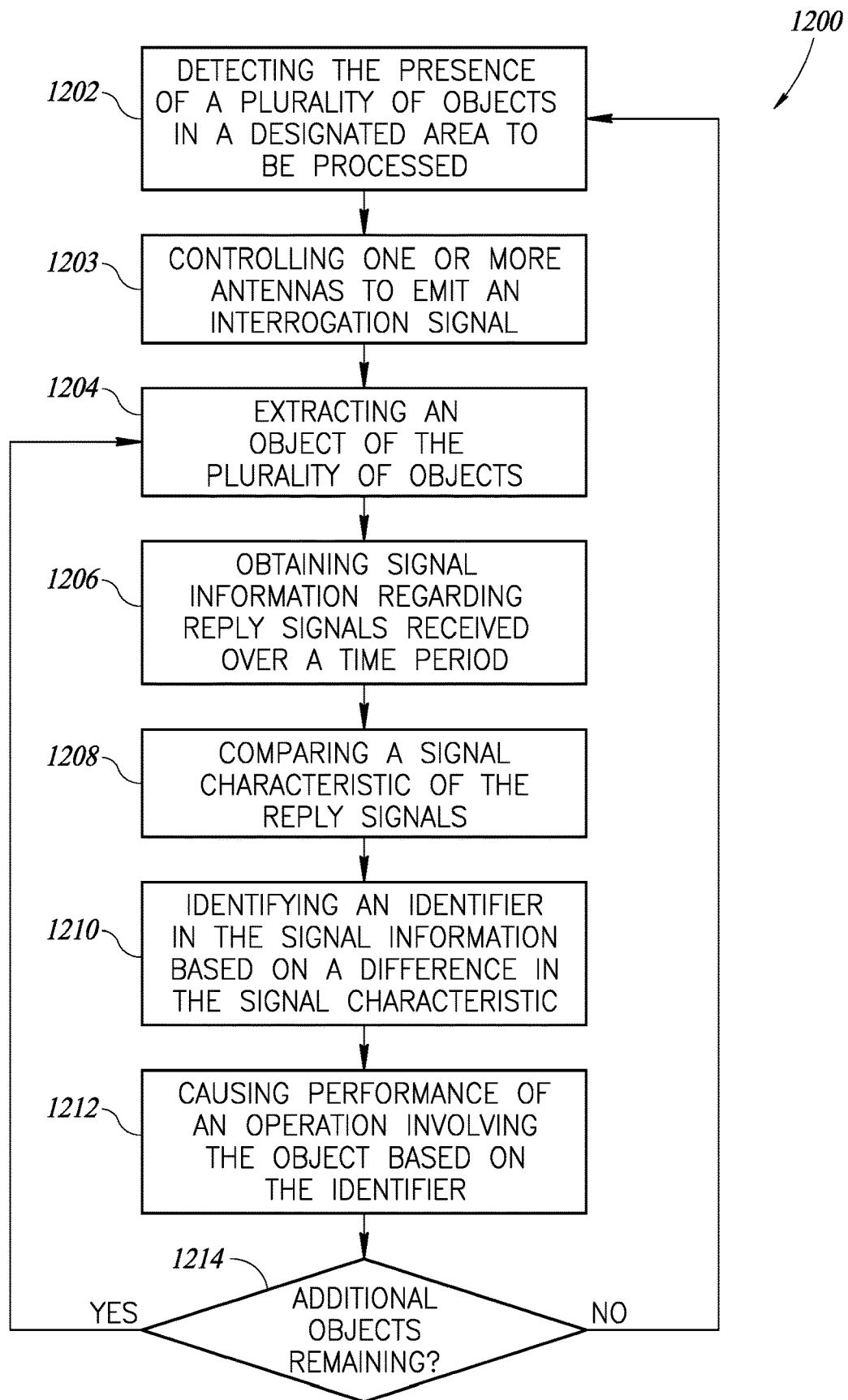
FIG. 12 is a method of recognizing a manipulated object of a plurality of objects according to one or more embodiments.

FIG. 12 shows a method 1200 for identifying an object of a plurality of objects in the environment 100 according to one or more embodiments. Operations of the method 1200 may be performed by one or more appropriate systems described herein, such as the computer system 110 or, in some embodiments, the robotic manipulator 106. The method 1200 includes detecting 1202 the presence of the plurality of objects 102 in the designated area 104. Detecting 1202 may include receiving, by the computer system 110, video data indicating the presence of the plurality of objects 102. The computer system 110 may determine that the robotic manipulator 106 is about to begin processing the plurality of objects 102 by extracting the object 114. In some embodiments, detecting 1202 includes receiving a communication or notification from the robotic manipulator 106 that processing of the plurality of objects 102 is about to begin.

The method 1200 includes controlling 1203 one or more of the antennas 108 to emit an RF interrogation signal over a first time period. The method 1200 also includes extracting 1204 the object 114 of the plurality of objects 102 from the designated area 104. Extracting 1204 may be performed, in some embodiments, autonomously (e.g., without receiving instructions from the computer system 110) by the robotic manipulator 106. In other embodiments, the computer system 110 may control or instruct the robotic manipulator 106 to process the plurality of objects 102 by extracting an object 114 therefrom. Some operations of the method 1200 may be performed in a different order than shown or described—for example, extracting 1204 an object 114 may be performed prior to controlling 12 021 or more of the antennas 108 in some embodiments.

The method 1200 proceeds by obtaining 1206 signal information regarding RF reply signals received via the one or more antennas 108 over a second period of time. The signal information obtained in 1206 includes an identifier and signal characteristics of the RF reply signal received. The signal information may include information regarding the particular antenna 108 receiving the RF reply signal and may include temporal information associated with the signal information. Additional signal information may be obtained in 1206 by controlling the one or more antennas to emit an RF interrogation signal and then obtaining signal information regarding RF reply signals received in response.

At 1208, the method 1200 includes comparing a signal characteristic of the RF reply signals received in connection with obtaining 1206 the signal information. For example, the computer system 110 may add, for each set of signal information, the signal characteristic values for each identifier into an aggregate value. Then, in 1210, the aggregate values of each identifier are compared and the identifier of the object 114 is determined as being the identifier having an aggregate value exceeding a defined threshold or satisfying another criteria.

Next, the method 1200 includes causing 1212 performance of an operation involving the object 114 based on the identifier determined. In particular, the computer system 110 references the data structure 412 and obtains operation instructions 414 for the identifier of the object 114. The computer system 110 may cause the robotic manipulator 106 or other devices or machinery to perform various operations according to the operation instructions 414 provided.

At 1214, the method includes determining whether additional objects remain in the plurality of objects 102 to be processed. If additional objects remain to be processed, the method 1200 returns to extract 1204 a remaining object of the plurality of objects 102 and various operations of the method 1200 are repeated. If, on the other hand, there are no additional objects to be processed in the plurality of objects 102, the method 1200 may return to wait until the presence of another plurality of objects is detected in the designated area 104.

In some embodiments, other short-range wireless transmission communication protocols may be used instead of, or in conjunction with, RFID. For example, the transponders 116 may include Bluetooth transponders, Bluetooth low energy transponders, Wi-Fi transponders, or optical transponders. Such active transponders may be utilized to supplement the use of the passive transponders described herein.

Figure 13:
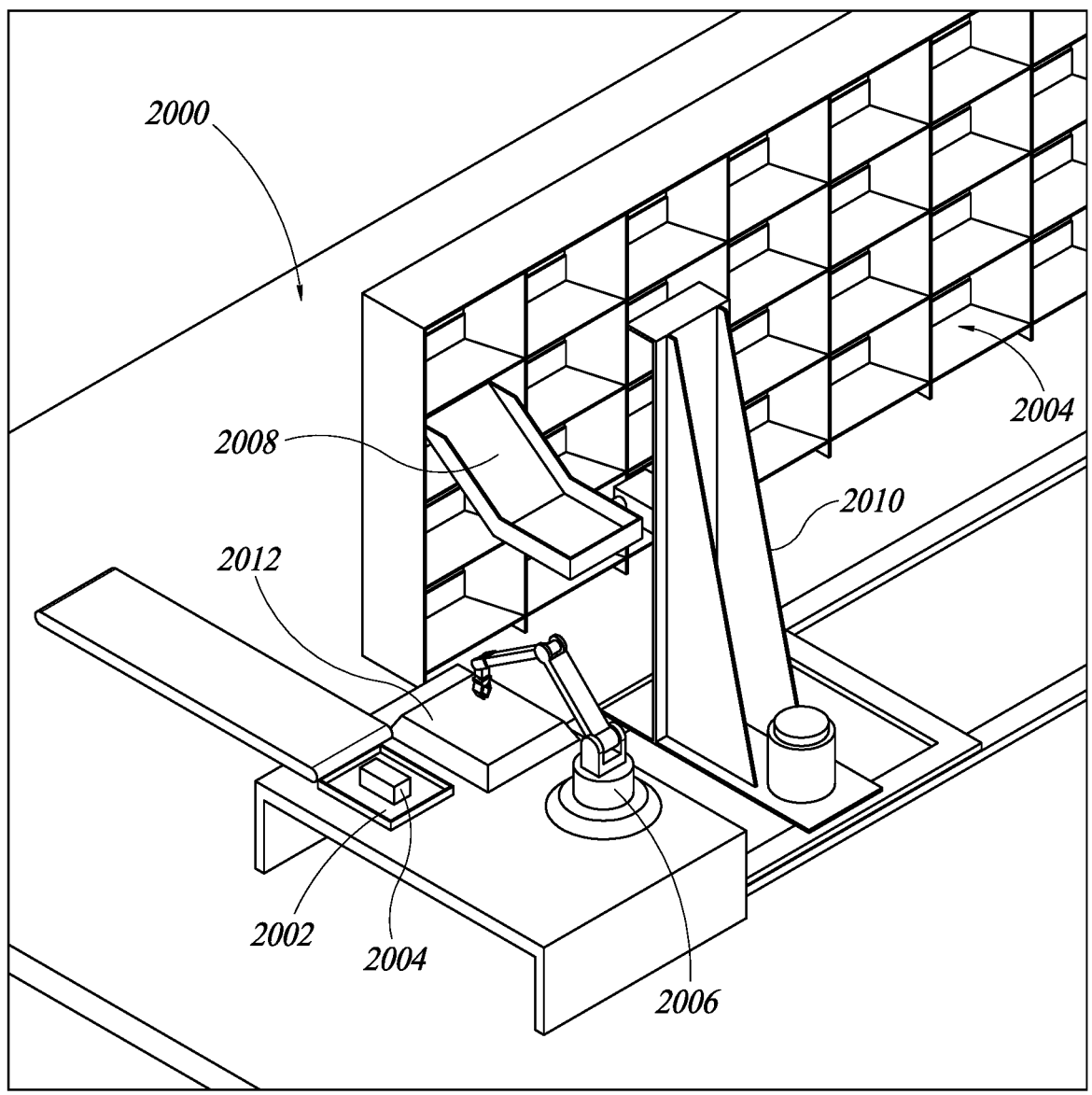
FIG. 13 illustrates a perspective view of a system for separating objects from a plurality of objects and detecting whether plural objects have been separated together.

FIG. 13 illustrates a perspective view of a system 2000 for separating single, individual objects from a plurality of objects ("singulating" the objects) and detecting whether plural objects have been separated together (which represents a failure to effectively singulate the objects, or a "double-pick"). The system 2000 may include any of the features described herein with respect to FIGS. 1-12, including of the environment 100, objects 102, designated area 104, robotic manipulator 106, antennas 108, computer systems 110, etc., and may be configured to perform any of the actions or methods described herein with respect to FIGS. 1-12.

As illustrated in FIG. 13, the system 2000 includes a designated area that takes the form of a bin 2002, and which may include any of the features described herein with respect to the designated area 104. A plurality of objects, which may include any of the features described herein with respect to the objects 102, and which include a first object 2004, may be supplied to the bin 2002 for singulation. The system 2000 also includes a robotic manipulator 2006, which may include any of the features described herein for the robotic manipulator 106, and which may be configured to pick up and move single, individual objects from the bin 2002 and move them to other portions of the system 2000 (to singulate the objects). In some embodiments, the robotic manipulator 2006 may include an end-of-arm tooling ("EOAT") that has electrically-, hydraulically-, mechanically-, and/or pneumatically-powered fingers or grippers. In some embodiments, the robotic manipulator 2006 may include an EOAT that has a suction and/or vacuum gripping mechanism.

As further illustrated in FIG. 13, the system 2000 includes a tray, which may be referred to as a "tilt tray" 2008, onto which the robotic manipulator 2006 can deposit singulated items for further processing. The tilt tray 2008 is mounted on and supported by a robotic subsystem, which may be referred to as a "carriage" 2010, and which is configured to move the tilt tray 2008 around in space with respect to other components of the system 2000. For example, the carriage 2010 is configured to move the tilt tray 2008 laterally side-to-side, toward or away from the robotic manipulator 2006, as well as up-and-down with respect to a direction or orientation of gravity. Further, the carriage 2010 is configured to hold the tilt tray 2008 in a first configuration or orientation, as illustrated in FIG. 13, which may be useful for holding and carrying the object 2004, and to tilt or rotate the tilt tray 2008 into a second configuration or orientation, which may be useful for depositing the object 2004 from the tilt tray 2008 to another portion of the system 2000.

As also illustrated in FIG. 13, the system 2000 includes a scale 2012, which may be configured to take a measurement of a weight of an object placed thereon. As illustrated in FIG. 13, the scale 2012 has a flat, horizontal upper surface onto which objects to be weighed can be deposited for a weighing operation. The flat, horizontal, upper surface of the scale 2012 can be located directly below a flat, horizontal portion of the tilt tray 2008, such that the tilt tray 2008 can be lowered onto the scale 2012 and the scale 2012 can measure the weight of the tilt tray 2008 together with any object(s) held thereon. A weight of the tilt tray 2008 (a tare weight) can be subtracted or removed from the measured weight to determine the weight of the object(s) held thereon.

As also illustrated in FIG. 13, the system 2000 includes a set of shelves, which may be referred to herein as a "rack" 2014, and into which singulated objects may be deposited from the tilt tray 2008. As illustrated in FIG. 13, the rack 2014 includes a plurality of, such as at least three or at least four, rows of shelves arranged above and below one another, and a plurality of, such as at least six or at least seven, columns of shelves arranged side-to-side adjacent or next to one another. Each of the individual shelves is open at a first side thereof that faces toward the tilt tray 2008 and the carriage 2010, and is open at a second side thereof opposite the first side. Thus, in some implementations, the objects may be deposited into the shelves at the first sides thereof from the tilt tray 2008, and may be retrieved from the shelves at the second sides thereof by a person or other robotic system, such as for further processing.

As illustrated in FIG. 13, a method of singulating individual objects from a plurality of objects may include receiving a plurality of objects, including the first object 2004, into the bin 2002, and moving the tilt tray 2008 until it is directly above the scale 212. Once the objects have been received in the bin 2002, the robotic manipulator 2006 may grasp and retrieve individual objects (e.g., the first object 2004) from the bin 2002, such as in accordance with any of the actions, methods, or techniques described herein with respect to FIGS. 1-12. Once an individual object such as the first object 2004 has been retrieved from the bin 2002, the robotic manipulator 2006 moves the object from the bin 2002 to the tilt tray 2008 and deposits the object onto the flat, horizontal portion of the tilt tray 2008.

Once the object has been deposited onto the tilt tray 2008, the carriage 2010 can move the tilt tray 2008 downward until the flat, horizontal portion of the tilt tray 2008 rests on the flat, horizontal upper surface of the scale, and the carriage 2010 can further disengage any rotationally and/or translationally rigid connections between the carriage 2010 and the tilt tray 2008, such that the tilt tray 2008 floats with respect to the carriage 2010, such as to reduce or eliminate any transmission of forces from the carriage 2010 to the scale 2012 and thereby improve accuracy of resulting measurements. The scale 2012 can then be used to take a measurement of the weight of the tilt tray 2008 and any objects held thereon.

The measurement of the weight can be used, such as in accordance with techniques described elsewhere herein, to determine either that the tilt tray 2008 is holding a single object, and thus that the singulation operation was successful, or that the tilt tray 2008 is holding more than a single object, and thus that the singulation operation was not successful. If it is determined that the tilt tray 2008 is holding a single object, and thus that the singulation operation was successful, then the system 2000 may further determine or identify which of the shelves in the rack 2014 the object is to be deposited into, which may be based on an object type of the object, as described elsewhere herein. If it is determined that the tilt tray 2008 is holding more than a single object, and thus that the singulation operation was not successful, then the system 2000 may further determine or identify which of the shelves in the rack 2014 the object is to be deposited into, which may be a shelf designated for "reject," "exception," or "fault" objects.

Once the measurement of the weight has been taken and it has been determined whether or not the tilt tray 2008 is holding a single object, the carriage 2010 can re-engage rotationally and/or translationally rigid connections to the tilt tray 2008, and move the tilt tray 2008 upward off of and away from the scale 2012. The carriage 2010 can then move the tilt tray 2008 sideways away from the bin 2002 to a horizontal location corresponding to or adjacent to a column of shelves including the shelf into which the object is to be deposited. The carriage 2010 can then move the tilt tray 2008 vertically up or down to a vertical location corresponding to or adjacent to a row of shelves including the shelf into which the object is to be deposited, such that the tilt tray 2008 is then adjacent to the shelf into which the object is to be deposited. The carriage 2010 can then tilt or rotate the tilt tray 2008 until the object slides off the tilt tray 2008 and into the shelf under the force of gravity.

Once the object has been deposited into the shelf in this manner, the carriage 2010 can tilt or rotate the tilt tray 2008 back to its original orientation, and move the tilt tray 2008 both horizontally and vertically back to its original position, such that it is arranged to receive another object from the robotic manipulator 2006.

Figure 14:
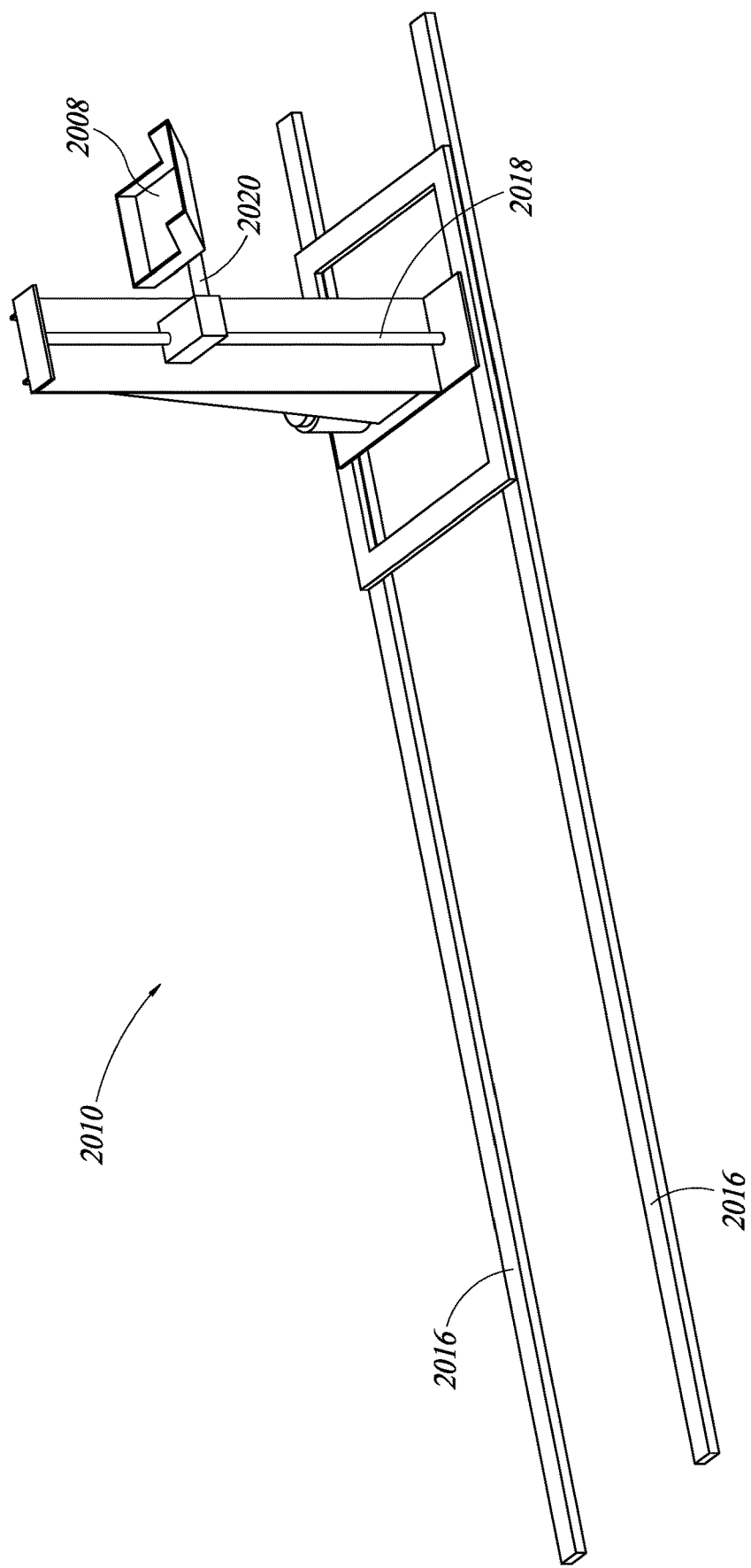
FIG. 14 illustrates a perspective view of a portion of the system of FIG. 13, including a tilt tray and associated components.

FIG. 14 illustrates the tilt tray 2008, the carriage 2010, and other related components separated from the rest of the system 2000. As illustrated in FIG. 14, the carriage 2010 is mounted on a pair of horizontal bars or rails 2016 that extend side-to-side, toward or away from the robotic manipulator 2006. The carriage 2010 may also include one or more motors or other actuators to actuate horizontal movement of the carriage 2010 along the rails 2016. As also illustrated in FIG. 14, the carriage 2010 includes a vertical bar or rail 2018 that extends up-and-down. The tilt tray 2008 is mounted to and supported by the carriage 2010 on a horizontal bar or rail 2020 such that the tilt tray 2008, together with the horizontal bar or rail 2020, can travel up-and-down with respect to a direction or orientation of gravity along the rail 2018. The carriage 2010 may also include one or more motors or other actuators to actuate vertical movement of the tilt tray 2008 and horizontal rail 2020 along the vertical rail 2018. The carriage 2010 may also include one or more motors or other actuators to actuate rotation of the horizontal rail 2020 about its own central longitudinal axis to cause the tilt tray 2008 to tilt or rotate about the same axis, or to actuate rotation of the tilt tray 2008 about the central longitudinal axis of the horizontal rail 2020 with respect to the horizontal rail 2020.

Figure 15:
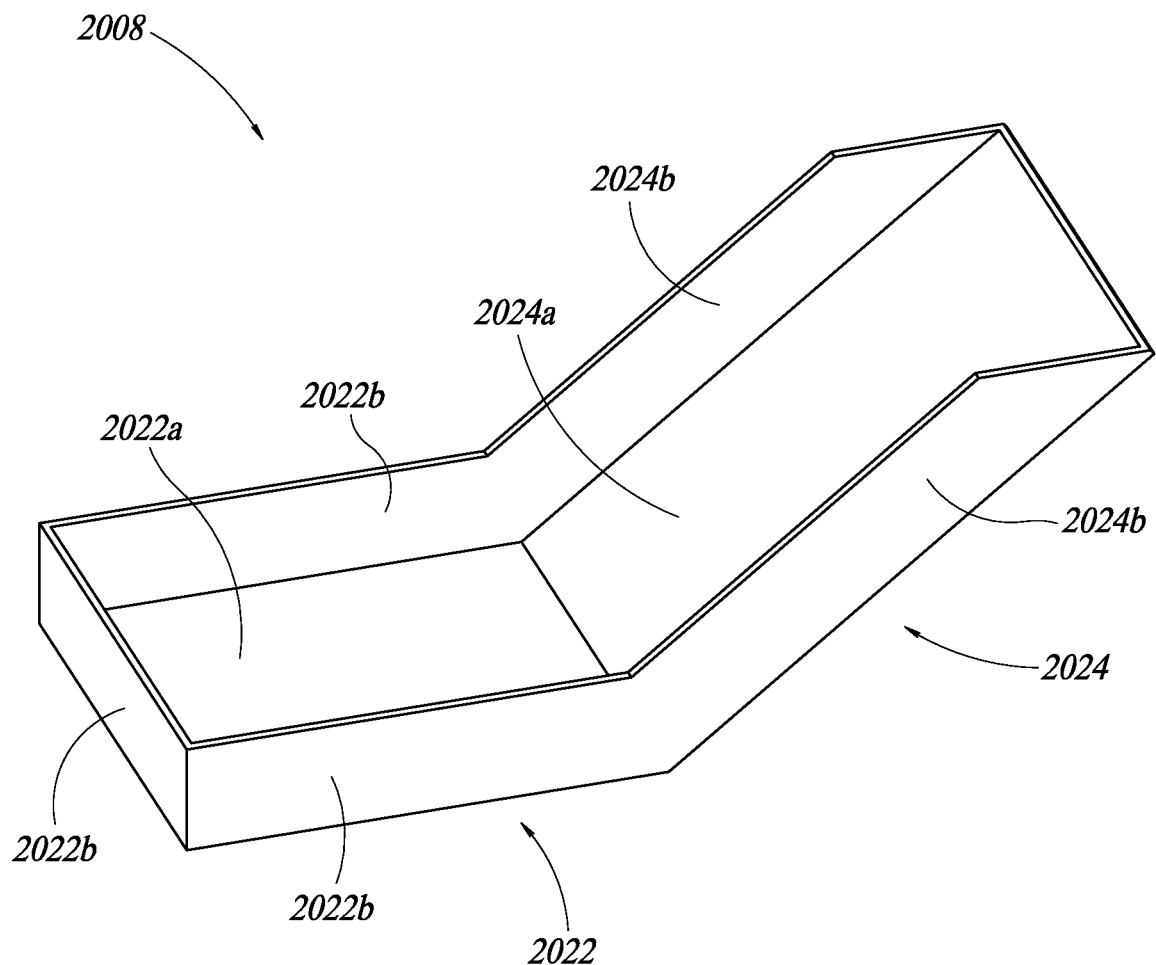
FIG. 15 illustrates a perspective view of the tilt tray of the system of FIG. 13.

FIG. 15 illustrates the tilt tray 2008 separated from the rest of the system 2000. As illustrated in FIG. 15, the tilt tray 2008 includes a first portion 2022, which includes the flat, horizontal portion of the tilt tray 2008 when the tilt tray 2008 is in its original orientation and ready to receive an object from the robotic manipulator 2006. As illustrated in FIG. 15, the first portion 2022 includes a rectangular bottom plate 2022a that forms the flat, horizontal portion thereof, and three rectangular sidewall plates 2022b that extend upward at right angles from respective side edges of the bottom plate 2022a and at right angles or parallel to one another, such that the first portion 2022 of the tilt tray 2008 forms a portion of a bin or a container for holding objects. In some implementations, two of the rectangular sidewall plates 2022b opposite and parallel to one another can include rails and the rectangular bottom plate 2022a can be mounted on the rails such that the bottom plate 2022a can be moved downward along the rails, such as into contact with the scale 2012, and upward along the rails, such as lifted off of the scale 2012.

As also illustrated in FIG. 15, the tilt tray 2008 includes a second portion 2024 that includes a flat bottom portion 2024*a* coupled to the rectangular bottom plate of the first portion 2022 at an oblique angle between 90 and 180 degrees. In some cases, the rectangular bottom plate of the first portion 2022 and the flat bottom portion of the second portion 2024 are integral with one another, and may be formed from a single piece of sheet metal bent or folded where they meet. As illustrated in FIG. 15, the second portion 2024 also includes two rectangular sidewall plates 2024*b* that extend upward at right angles from respective side edges of the flat bottom portion and parallel to one another, such that the second portion 2024 of the tilt tray 2008 forms a portion of a bin or a container for holding objects.

The second portion 2024 is coupled to the first portion 2022 at a side edge of the first portion 2022 that is not coupled to one of the sidewall plates 2022*b* of the first portion 2022, and at a side edge of the second portion 2024 that is not coupled to one of the sidewall plates 2024*b* of the second portion 2024. Thus, as illustrated in FIG. 15, the tilt tray 2008 forms a container that extends from an end of the first portion 2022 opposite the second portion 2024, where it is closed by one of the sidewall plates 2022*a* of the first portion 2022, to an end of the second portion 2024 opposite the first portion 2022, where it is not closed by one of the sidewall plates 2024*a* of the second portion 2024. In use, the tilt tray 2008 can be originally oriented with the first portion 2022 horizontal and configured to receive and hold an object. Once it receives an object and is moved to a specified location adjacent to a specific shelf of the rack 2014, the tilt tray 2008 can be tilted or rotated about an axis parallel to or coincident with the joint between the rectangular bottom plate of the first portion 2022 and the flat bottom portion of the second portion 2024, such that the object held therein slides across the rectangular bottom plate of the first portion 2022, across the flat bottom portion of the second portion 2024, and out the end of the second portion 2024 opposite the first portion 2022 into the specific shelf of the rack 2014, where it is ready to be retrieved for subsequent sorting, scanning, placement, or other operations.

While the system 2000 is illustrated and described as including various components, the system 2000 may be provided with fewer than all of the illustrated and/or described components. For example, the system 2000 may not include the rack 2014 or its shelves. In such implementations, the tilt tray 2008 and the carriage 2010 may be used to deposit objects into different bins, onto different conveyor belts, or generally into different locations based on an object type of the object and the determination that the tilt tray 2008 is or is not holding more than a single object. As another example, the system 2000 may not include the scale 2012. In such implementations, a measurement of a weight of the object(s) held by the tilt tray 2008 may be taken by a load cell or a strain gage incorporated into the robotic manipulator 2006, into the tilt tray 2008, and/or into the carriage 2010.

As another example, the system 2000 may not include the tilt tray 2008, the carriage 2010, and the scale 2012. In such implementations, the robotic manipulator 2006 may be used to deposit objects into the shelves of the rack 2014, into different bins, onto different conveyor belts, or generally into different locations based on an object type of the object and a determination that the robotic manipulator 2006 is or is not holding more than a single object. Such a determination can be made in accordance with any of the actions, techniques or methods described herein, and may be based on a measurement of a weight of an object held by the robotic manipulator 2006, which may be taken by a load cell or a strain gage incorporated into the robotic manipulator 2006. Further, while the system 2000 is illustrated and described as including a single tilt tray 2008 and a single carriage 2010 for carrying the tilt tray 2008, in other embodiments, the system 2000 includes multiple tilt trays 2008 and multiple carriages 2010 for carrying the tilt trays 2008, such as in an assembly line fashion, which may increase the overall processing speed of the system 2000.

Figure 16:
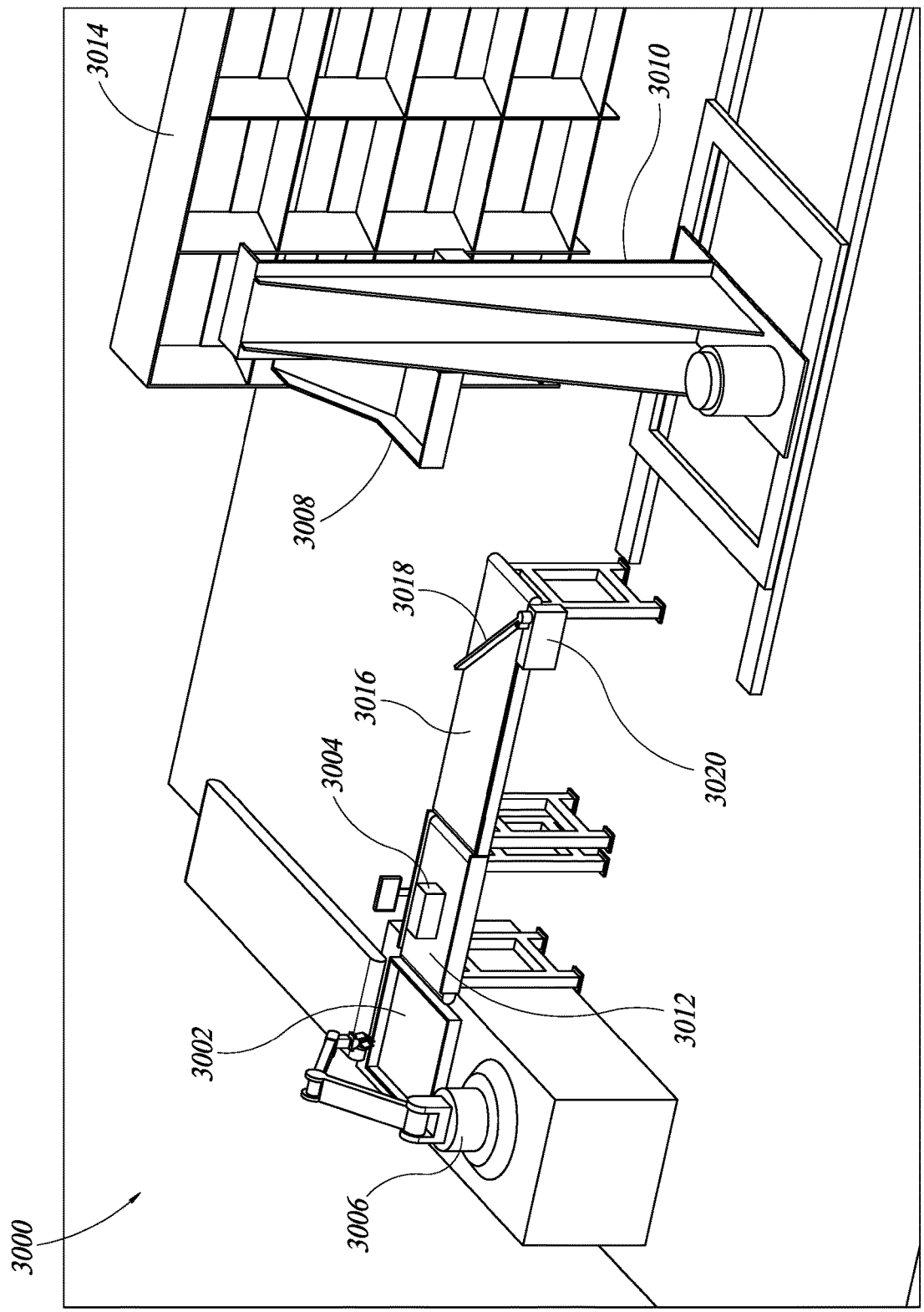
FIG. 16 illustrates a perspective view of another system for separating objects from a plurality of objects and detecting whether plural objects have been separated together.

FIG. 16 illustrates a perspective view of a system 3000 for separating single, individual objects from a plurality of objects ("singulating" the objects) and detecting whether plural objects have been separated together (which represents a failure to effectively singulate the objects, or a "double-pick"). The system 3000 may include any of the features described herein with respect to FIGS. 1-15, including of the environment 100, objects 102, designated area 104, robotic manipulator 106, antennas 108, computer systems 110, etc., and may be configured to perform any of the actions or methods described herein with respect to FIGS. 1-15.

As illustrated in FIG. 16, the system 3000 includes a designated area that takes the form of a bin 3002, and which may include any of the features described herein with respect to the designated area 104. A plurality of objects, which may include any of the features described herein with respect to the objects 102, and which include a first object 3004, may be supplied to the bin 3002 for singulation. The system 3000 also includes a robotic manipulator 3006, which may include any of the features described herein for the robotic manipulator 106, and which may be configured to pick up and move single, individual objects from the bin 3002 and move them to other portions of the system 3000 (to singulate the objects). In some embodiments, the robotic manipulator 3006 may include an end-of-arm tooling ("EOAT") that has electrically-, hydraulically-, mechanically-, and/or pneumatically-powered fingers/grippers. In some embodiments, the robotic manipulator 3006 may include an EOAT that has a suction and/or vacuum gripping mechanism.

As further illustrated in FIG. 16, the system 3000 includes a tray, which may be referred to as a "tilt tray" 3008, onto which singulated items can be deposited for further processing. The tilt tray 3008 is mounted on and supported by a robotic subsystem, which may be referred to as a "carriage" 3010, and which is configured to move the tilt tray 3008 around in space with respect to other components of the system 3000. For example, the carriage 3010 is configured to move the tilt tray 3008 laterally side-to-side, toward or away from the robotic manipulator 3006, as well as up-and-down with respect to a direction or orientation of gravity. Further, the carriage 3010 is configured to hold the tilt tray 3008 in a first configuration or orientation, which may be useful for holding and carrying the object 3004, and to tilt or rotate the tilt tray 3008 into a second configuration or orientation, which may be useful for depositing the object 3004 from the tilt tray 3008 to another portion of the system 3000.

As also illustrated in FIG. 16, the system 3000 includes a weighing conveyor or weighing conveyor belt 3012, which may be configured to take a measurement of a weight of an object placed thereon as it conveys the object across its upper surface in a direction extending away from the bin 3002. As illustrated in FIG. 16, the weighing conveyor belt 3012 has a flat, horizontal upper surface onto which objects to be weighed can be deposited for a weighing operation. As also illustrated in FIG. 16, the system 3000 further includes a separating conveyor or separating conveyor belt 3016, which may be configured to redirect objects being conveyed across its upper surface in a direction extending away from the bin 302. As illustrated in FIG. 16, the separating conveyor belt 3016 has a flat, horizontal upper surface onto which objects to be separated can be deposited for a separating operation, and a rotatable arm or wiper 3018 controllable by a pneumatic rotary actuator 3020 to rotate about a vertical axis across the flat, horizontal upper surface of the separating conveyor belt 3016.

As also illustrated in FIG. 16, the system 3000 includes a set of shelves, which may be referred to herein as a "rack" 3014, and into which singulated objects may be deposited from the tilt tray 3008. As illustrated in FIG. 16, the rack 3014 includes a plurality of, such as at least three or at least four, rows of shelves arranged above and below one another, and a plurality of, such as at least six or at least seven, columns of shelves arranged side-to-side adjacent or next to one another. Each of the individual shelves is open at a first side thereof that faces toward the tilt tray 3008 and the carriage 3010, and is open at a second side thereof opposite the first side. Thus, in some implementations, the objects may be deposited into the shelves at the first sides thereof from the tilt tray 3008, and may be retrieved from the shelves at the second sides thereof by a person or other robotic system, such as for further processing.

As illustrated in FIG. 16, a method of singulating individual objects from a plurality of objects may include receiving a plurality of objects, including the first object 3004, into the bin 3002, and moving the tilt tray 3008 until it is positioned to receive objects from a terminal, distal end of the separating conveyor 3016. Once the objects have been received in the bin 3002, the robotic manipulator 3006 may grasp and retrieve individual objects (e.g., the first object 3004) from the bin 3002, such as in accordance with any of the actions, methods, or techniques described herein with respect to FIGS. 1-12. Once an individual object such as the first object 3004 has been retrieved from the bin 3002, the robotic manipulator 3006 moves the object from the bin 3002 to the weighing conveyor 3012 and deposits the object onto the flat, horizontal upper surface of the weighing conveyor 3012.

The weighing conveyor 3012 can then be used to take a measurement of the weight of the object deposited thereon and to simultaneously convey the object across its upper surface away from the bin 3002 and toward the separating conveyor 3016. The measurement of the weight can be used, such as in accordance with techniques described elsewhere herein, to determine either that the weighing conveyor 3012 is conveying a single object, and thus that the singulation operation was successful, or that the weighing conveyor 3012 is holding more than a single object, and thus that the singulation operation was not successful. If it is determined that the weighing conveyor 3012 is conveying a single object, and thus that the singulation operation was successful, then the system 3000 may further determine or identify which of the shelves in the rack 3014 the object is to be deposited into, which may be based on an object type of the object, as described elsewhere herein. If it is determined that the weighing conveyor 3012 is conveying more than a single object, and thus that the singulation operation was not successful, then the system 3000 may further determine or identify that the objects are to be deposited into a bin, shelf, or further conveyor belt designated for "reject," "exception," or "fault" objects.

Once the measurement of the weight has been taken and it has been determined whether or not the weighing conveyor 3012 is conveying a single object, the object(s) are deposited from the weighing conveyor 3012 onto the adjacent separating conveyor 3016. If it was determined that the weighing conveyor 3012 was conveying a single object, then the pneumatic rotary actuator 3020 is operated to actuate the wiper 3018 to rotate off of the upper surface of the separating conveyor 3016, such that there is a clear path for the object to travel across the upper surface of the separating conveyor 3016, and to simultaneously convey the object across the upper surface of the separating conveyor 3016 away from the bin 3002 and toward the tilt tray 3008. The object is then conveyed across the upper surface of the separating conveyor 3016, and is deposited from the separating conveyor 3016 into the tilt tray 3008, which was originally positioned to catch objects falling off the terminal, distal end of the separating conveyor 3016 farthest from the bin 3002.

If it was determined that the weighing conveyor 3012 was conveying more than a single object, then the pneumatic rotary actuator 3020 is operated to actuate the wiper 3018 to rotate onto the upper surface of the separating conveyor 3016, such that there is not a clear path for the object to travel across the upper surface of the separating conveyor 3016, and such that the wiper 3018 is positioned to redirect the objects to fall off a side of the separating conveyor 3016, and to simultaneously convey the objects across the upper surface of the separating conveyor 3016 away from the bin 3002 and toward the tilt tray 3008. The objects are then conveyed across the upper surface of the separating conveyor 3016 until they collide with the wiper 3018, and are then redirected to fall off the side of the separating conveyor 3016, such as into a bin, shelf, or further conveyor belt designated for "reject," "exception," or "fault" objects.

If the object has been deposited onto the tilt tray 3008, the carriage 3010 can move the tilt tray 3008 sideways away from the bin 3002 to a horizontal location corresponding to or adjacent to a column of shelves including the shelf into which the object is to be deposited. The carriage 3010 can then move the tilt tray 3008 vertically up or down to a vertical location corresponding to or adjacent to a row of shelves including the shelf into which the object is to be deposited, such that the tilt tray 3008 is then adjacent to the shelf into which the object is to be deposited. The carriage 3010 can then tilt or rotate the tilt tray 3008 until the object slides off the tilt tray 3008 and into the shelf under the force of gravity, where it is ready to be retrieved for subsequent sorting, scanning, placement, or other operations.

Once the object has been deposited into the shelf in this manner, the carriage 3010 can tilt or rotate the tilt tray 3008 back to its original orientation, and move the tilt tray 3008 both horizontally and vertically back to its original position, such that it is arranged to receive another object.

While the system 3000 is illustrated and described as including various components, the system 3000 may be provided with fewer than all of the illustrated and/or described components. For example, the system 3000 may not include the rack 3014 or its shelves. In such implementations, the tilt tray 3008 and the carriage 3010 may be used to deposit objects into different bins, onto different conveyor belts, or generally into different locations based on an object type of the object. As another example, the system 3000 may not include the weighing conveyor 3012. In such implementations, a measurement of a weight of the object(s) held by the robotic manipulator 3006 and/or the tilt tray 3008 may be taken by a load cell or a strain gage incorporated into the robotic manipulator 3006.

As another example, the system 3000 may not include the tilt tray 3008, the carriage 3010, and the weighing conveyor 3012. In such implementations, the robotic manipulator 3006 may be used to deposit objects into the shelves of the rack 3014, into different bins, onto different conveyor belts, or generally into different locations based on an object type of the object and a determination that the robotic manipulator 3006 is or is not holding more than a single object. Such a determination can be made in accordance with any of the actions, techniques or methods described herein, and may be based on a measurement of a weight of an object held by the robotic manipulator 3006, which may be taken by a load cell or a strain gage incorporated into the robotic manipulator 3006. Further, while the system 3000 is illustrated and described as including a single tilt tray 3008 and a single carriage 3010 for carrying the tilt tray 3008, in other embodiments, the system 3000 includes multiple tilt trays 3008 and multiple carriages 3010 for carrying the tilt trays 3008, such as in an assembly line fashion, which may increase the overall processing speed of the system 3000.

The system 2000 and/or the system 3000 may be located and configured for operation within a storage space such as a bin, a box, a sorting station, a room, or a volume that is used to store, hold, warehouse, or otherwise contain objects, and/or within a larger assembly line arrangement. The system 2000 and/or the system 3000 may further be located and configured for operation within a retail supply chain warehouse where the objects to be singulated may include apparel, consumer goods, merchandise, and the like, and/or other items such as tools, parts, components, packages, letters, foodstuffs, and the like.

As described elsewhere herein, a measurement of a weight of an object picked up by a robotic manipulator can be used to determine either that the singulation operation was successful, or that the singulation operation was not successful. In some embodiments, such a determination may be made by first determining an identity or characteristic(s) of the object (or at least one of the objects) picked up by the robotic manipulator. Such a determination may be made by any of the methods described herein, by reading RFID tags, scanning barcode(s) on the object(s), or visually, such as by using artificial intelligence techniques to identify objects or their characteristics from images of the objects, such as may be obtained by a camera.

Once the identity or characteristic(s) of the object (or at least one of the objects) are determined, the system 2000 or 3000 may locate a measure of an expected or acceptable weight or an expected or acceptable range of weights for such an object, such as by reference to a database or lookup table stored in any of the storage devices described herein. For example, such a database may map various object identities and characteristics, such as types, shapes, sizes, and/or classes (e.g., a children's clothing class, an adult clothing class, or a consumable product class), to expected or acceptable weights or weight ranges. In some cases, an expected or acceptable weight range may be specified as an expected or acceptable average weight and an acceptable deviation from the average weight, such as in the form of x±y % or x±y, or may be specified simply as acceptable upper and lower bounds. In some examples, an expected or acceptable weight range may be small, e.g., such that the acceptable upper bound is equal to the acceptable lower bound or the y % or y are equal to zero, or may be larger, e.g., such that the y % is equal to 10%, 20%, 30%, 40%, 50%, 60%, 70%, 80%, 90%, or any other suitable value.

Once the expected or acceptable weight range is located or determined, the measured weight of the object, obtained as described elsewhere herein, is compared to the expected or acceptable weight or weight range for the object. If the measured weight falls within the expected or acceptable range of weights, then it may be concluded that the singulation operation was successful, and if the measured weight falls outside the expected or acceptable range of weights, then it may be concluded that the singulation operation was not successful.

In some implementations, expected weight ranges are learned over time. For example, the systems described herein may begin with no knowledge of the weights of objects to be singulated. As objects are weighed and singulated, however, the system may store the measured weights and thereby learn both what different types of objects typically weigh as well as how much their weight typically varies. In some embodiments, acceptable weight ranges are determined or assigned based on this expected weight information alone. In other implementations, however, the system may be provided with the identities or characteristics of the objects to be singulated in advance of the singulation, and the acceptable weight ranges may be determined or assigned based on the learned expected weights and weight ranges, as well as on the specified identities or characteristics of the objects to be singulated.

For example, if the system is informed that objects are to be singulated from only one type or class of object, then the system may determine an acceptable weight range for the objects based on the weight measurements for only objects of that class. As one example, it may be determined that for a given first class of objects, the average weight is 10 pounds and the range of measured weights makes an optimum acceptable weight range, when objects are to be singulated from only that class of objects, 2-18 pounds (this would prevent a double pick of two ten pound objects but allow for a relatively wide range of weights of the objects). As another example, it may be determined that for a given second class of objects, the average weight is 7 pounds and the range of measured weights makes an optimum acceptable weight range, when objects are to be singulated from only that class of objects, 5-9 pounds (this would prevent a double pick of two seven pound objects and provide a narrower range of weights of the objects than for the first class).

If, however, the system is informed that objects are to be singulated from a collection of both the first and the second classes of objects, then the system may determine that different acceptable weight ranges are more appropriate and would lead to more optimal results. For example, in such a case, the system may determine that the optimum acceptable weight range for the first class of objects is now 4-16 pounds (this would prevent a double pick of a ten pound object with a seven pound object, where the range of 2-18 pounds would not). In general, then, the system may determine the acceptable weight ranges for the objects to be singulated, and may narrow the bounds of the acceptable weight ranges for heavier objects that are being singulated from collections of objects that also include lighter objects. Such techniques, and any of the actions, techniques, or methods described herein may be performed using artificial intelligence, machine learning, recursive learning, reinforced learning, neural network, or other related techniques.

U.S. provisional patent application No. 62/847,011, filed May 13, 2019, is hereby incorporated by reference in its entirety. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A singulation system, comprising:
a container configured to receive singulated objects from a collection of objects to be singulated;
a robotic manipulator configured to pick up an individual object from the collection of objects;
a sensor configured to measure a weight of the individual object; and
a computer system configured to:
determine an acceptable range of weights for the individual object based on an expected range of weights, the expected range of weights having been learned from measured weights of singulated objects of a same class as the individual object; and
compare the measured weight of the individual object to the acceptable range of weights for the individual object to determine whether the individual object was successfully singulated.

2. The singulation system of claim 1 wherein the container is a tilt tray.

3. The singulation system of claim 1 wherein the robotic manipulator is configured to deposit the individual object into the container and the sensor is a scale configured to measure a weight of the individual object while the individual object is in the container.

4. The singulation system of claim 1 wherein the sensor is a component of the robotic manipulator.

5. The singulation system of claim 4 wherein the sensor is a scale.

6. The singulation system of claim 4 wherein the sensor is a strain gage.

7. The singulation system of claim 1 wherein the sensor is a weighing conveyor belt and the robotic manipulator is configured to deposit the individual object onto the weighing conveyor belt.

8. The singulation system of claim 7, further comprising a separating conveyor belt configured to receive the individual object from the weighing conveyor belt.

9. The singulation system of claim 8 wherein the separating conveyor belt includes a diverter configured to modify a path across the separating conveyor belt based on the determination whether the individual object was successfully singulated.

10. The singulation system of claim 9 wherein the diverter is a wiper configured to move to a first position, wherein in the first position the wiper blocks the path across the separating conveyor belt, and to move to a second position, wherein in the second position the wiper does not block the path across the separating conveyor belt.

11. The singulation system of claim 1, wherein the computer system is further configured to:
cause the robotic manipulator to deposit the individual object into a first location or a second location based on the determination whether the individual object was successfully singulated.

12. A singulation apparatus, comprising:
a robotic manipulator configured to pick up an individual object from a collection of objects;
a sensor configured to measure a weight of the individual object; and
a computer system configured to:
determine an acceptable range of weights for the individual object based on an expected range of weights, the expected range of weights having been learned from measured weights of singulated objects of a same class as the individual object; and
compare the measured weight of the individual object to the acceptable range of weights for the individual object to determine whether the individual object was successfully singulated.

13. The singulation apparatus of claim 12, further comprising a tilt tray configured to receive singulated objects from the collection of objects to be singulated.

14. The singulation apparatus of claim 12, wherein the sensor is a component of the robotic manipulator.

15. The singulation apparatus of claim 14, wherein the sensor is a scale.

16. The singulation apparatus of claim 14, wherein the sensor is a strain gage.

17. The singulation apparatus of claim 12, wherein the sensor is a weighing conveyor belt and the robotic manipulator is configured to deposit the individual object onto the weighing conveyor belt.

18. The singulation apparatus of claim 17, further comprising a separating conveyor belt configured to receive the individual object from the weighing conveyor belt.

19. The singulation apparatus of claim 18, wherein the separating conveyor belt includes a diverter configured to modify a path across the separating conveyor belt based on the determination whether the individual object was successfully singulated.

20. The singulation apparatus of claim 19, wherein the diverter is a wiper configured to move to a first position, wherein in the first position the wiper blocks the path across the separating conveyor belt, and to move to a second position, wherein in the second position the wiper does not block the path across the separating conveyor belt.

* * * * *